(12) United States Patent
Yu et al.

(10) Patent No.: US 10,098,029 B2
(45) Date of Patent: Oct. 9, 2018

(54) MOBILE COMMUNICATION DEVICES AND METHODS FOR PERFORMING REFERENCE SIGNAL MEASUREMENTS

(71) Applicant: Intel IP Corporation, Santa Clara, CA (US)

(72) Inventors: Zhibin Yu, Unterhaching (DE); Tianyan Pu, Santa Clara, CA (US); Qing Xu, Unterhaching (DE)

(73) Assignee: Intel IP Corporation, Santa Clara, CA (US)

( * ) Notice: Subject to any disclaimer, the term of this patent is extended or adjusted under 35 U.S.C. 154(b) by 250 days.

(21) Appl. No.: 14/956,415

(22) Filed: Dec. 2, 2015

(65) Prior Publication Data

US 2017/0164225 A1 Jun. 8, 2017

(51) Int. Cl.
*H04W 24/10* (2009.01)
*H04B 17/309* (2015.01)

(52) U.S. Cl.
CPC .......... *H04W 24/10* (2013.01); *H04B 17/309* (2015.01)

(58) Field of Classification Search
CPC ..... H04W 24/10; H04W 24/02; H04W 24/08; H04W 24/00; H04B 17/309; H04B 17/327; H04B 17/336; H04B 17/345; H04B 17/382; H04L 5/0057; H04L 1/0026; H04L 5/0035
See application file for complete search history.

(56) References Cited

U.S. PATENT DOCUMENTS

2012/0040696 A1 2/2012 Siomina et al.

OTHER PUBLICATIONS

Acorn Technologies, "Opportunities for RSTD estimation error reductions", 3GPP TSG RAN WG1 Meeting #81, May 25-29, 2015, Fukuoka Japan.
The Extended European Search Report based on Application No. 16194941.7(10 Pages) dated Mar. 31, 2017 (Reference Purpose Only).
Section 6.10.4.2 of the 3GPP Technical Specification TS 36.211 "Evolved Universal Terrestrial Radio Access (E-UTRA); Physical channels and modulation" V12.5.0 (Release 12) of Mar. 2015 ("3GPP TS 36.211 (Release 12)"), 136 pages.
Section 6.5 of the 3GPP Technical Specification TS 36.355 "Evolved Universal Terrestrial Radio Access (E-UTRA); LTE Positioning Protocol (LPP)" V12.4.0 (Release 12) of Mar. 2015 ("3GPP TS 36.355 (Release 12)"), 126 pages.

(Continued)

*Primary Examiner* — Ian N Moore
*Assistant Examiner* — Brian T Le
(74) *Attorney, Agent, or Firm* — Viering, Jentschura & Partner mbB

(57) ABSTRACT

A method for performing reference signal measurements on a plurality of cells may include obtaining a plurality of channel quality metrics for the plurality of cells, assigning a plurality of cell measurement priority rankings to the plurality of cells based on the plurality of channel quality metrics, based on the plurality of cell measurement priority rankings, selecting one or more target cells from the plurality of cells to measure during one or more reference signal periods to obtain a plurality of reference signal measurements, and reporting the plurality of reference signal measurements to a communication network.

22 Claims, 11 Drawing Sheets

(56) References Cited

OTHER PUBLICATIONS

Section 5.1.12 of the 3GPP Technical Specification TS 36.214 "Evolved Universal Terrestrial Radio Access (E-UTRA); Physical Layer Measurements" V12.2.0 (Release 12) of Mar. 2015 ("3GPP TS 36.214 (Release 12)"), 17 pages.
Sections 8.1.2.5-8.1.2.4 of the 3GPP Technical Specification TS 36.133 "Evolved Universal Terrestrial Radio Access (E-UTRA); Requirements for support of radio resource management" V13.1.0 (Release 13) of Sep. 2015 ("3GPP TS 36.133(Release 13)"), 232 pages.
Fischer, Sven: Observed Time Difference of Arrival (OTDOA) Positioning in 3GPP LTE, Qualcomm Technologies Inc., Jun. 6, 2014, 62 pages.

MOBILE COMMUNICATION DEVICES AND METHODS FOR PERFORMING REFERENCE SIGNAL MEASUREMENTS

TECHNICAL FIELD

Various embodiments relate generally to mobile communication devices and methods for performing reference signal measurements.

BACKGROUND

Release 9 of the Long Term Evolution (LTE) standard by the $3^{rd}$ Generation Partnership Project (3GPP) introduced Observed Time Difference of Arrival (OTDOA) as a User Equipment (UE) positioning mechanism for determining the geographical location of a UE. In an OTDOA procedure, a UE may measure reference signals received from multiple base stations (eNodeBs in an LTE context) in order to determine the time of arrival (TOA) of each reference signal. The UE may then report back Reference Signal Time Difference (RSTD) measurements to the serving cell of the UE, where each RSTD measurement indicates the difference in TOA between a Positioning Reference Signal (PRS) received from a reference cell and a PRS received from a measured cell. The serving base station (corresponding to the serving cell of the UE) may then utilize the reported RSTD measurements in order to determine the geographic location of the UE based on known geographical information of the reference and measured cells.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
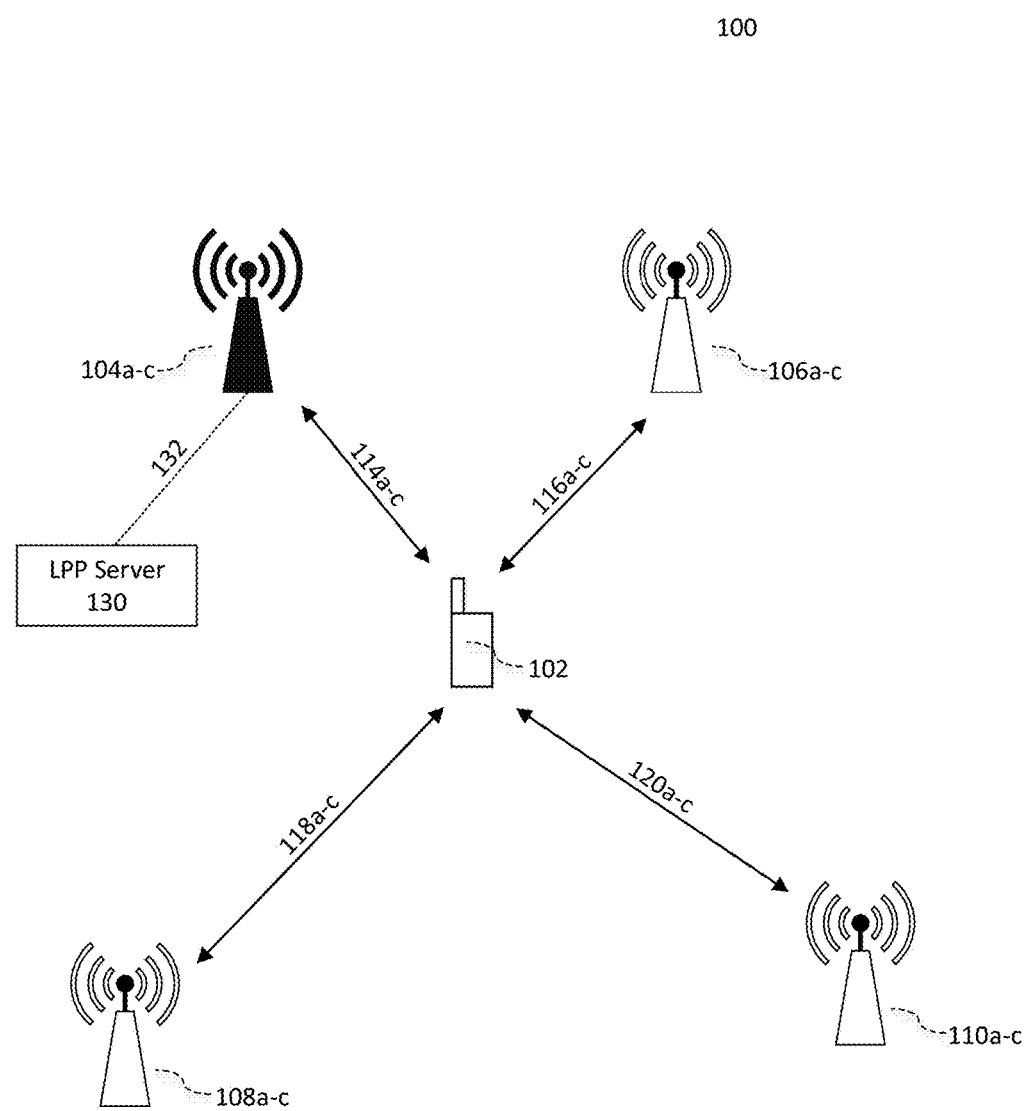
FIG. 1 shows a mobile communication network include a mobile terminal and a plurality of base stations.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The words "plural" and "multiple" in the description and the claims, if any, are used to expressly refer to a quantity greater than one. Accordingly, any phrases explicitly invoking the aforementioned words (e.g. "a plurality of [objects]", "multiple [objects]") referring to a quantity of objects is intended to expressly refer more than one of the said objects. The terms "group", "set", "collection", "series", "sequence", "grouping", "selection", etc., and the like in the description and in the claims, if any, are used to refer to a quantity equal to or greater than one, i.e. one or more.

It is appreciated that any vector and/or matrix notation utilized herein is exemplary in nature and is employed solely for purposes of explanation. Accordingly, it is understood that the approaches detailed in this disclosure are not limited to being implemented solely using vectors and/or matrices, and that the associated processes and computations may be equivalently performed with respect to sets, sequences, groups, etc., of data, observations, information, signals, etc. Furthermore, it is appreciated that references to a "vector" may refer to a vector of any size or orientation, e.g. including a 1×1 vector (e.g. a scalar), a 1×M vector (e.g. a row vector), and an M×1 vector (e.g. a column vector). Similarly, it is appreciated that references to a "matrix" may refer to matrix of any size or orientation, e.g. including a 1×1 matrix (e.g. a scalar), a 1×M matrix (e.g. a row vector), and an M×1 matrix (e.g. a column vector).

As used herein, a "circuit" may be understood as any kind of logic implementing entity (analog or digital), which may be special purpose circuitry or a processor executing software stored in a memory, firmware, hardware, or any combination thereof. Furthermore, a "circuit" may be a hard-wired logic circuit or a programmable logic circuit such as a programmable processor, for example a microprocessor (for example a Complex Instruction Set Computer (CISC) processor or a Reduced Instruction Set Computer (RISC) processor). A "circuit" may also be a processor executing software, for example any kind of computer program, for example a computer program using a virtual machine code such as for example Java. Any other kind of implementation of the respective functions which will be described in more detail below may also be understood as a "circuit". It is understood that any two (or more) of the described circuits may be combined into a single circuit with substantially equivalent functionality, and conversely that any single described circuit may be distributed into two (or more) separate circuits with substantially equivalent functionality. Accordingly it is understood that references to a "circuit" may refer to two or more circuits that collectively form a single circuit.

A "processing circuit" (or equivalently "processing circuitry") as used herein is understood as referring to any circuit that performs an operation on a signal or signals, such as e.g. any circuit that performs processing on an electrical signal or an optical signal. A processing circuit may thus refer to any analog or digital circuitry that alters a characteristic or property of an electrical or optical signal, which may include analog and/or digital data. A processing circuit may thus refer to an analog circuit (explicitly referred to as "analog processing circuit(ry)"), digital circuit (explicitly referred to as "digital processing circuit(ry)"), logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Accordingly, a processing circuit may refer to a circuit that performs processing on an electrical or optical signal as hardware or as software, such as software executed on hardware (e.g. a processor or microprocessor). As utilized herein, "digital processing circuit(ry)" may refer to a circuit implemented using digital logic that performs processing on a signal, e.g. an electrical or optical signal, which may include logic circuit(s), processor(s), scalar processor(s), vector processor(s), microprocessor(s), controller(s), microcontroller(s), Central Processing Unit(s) (CPU), Graphics Processing Unit(s) (GPU), Digital Signal Processor(s) (DSP), Field Programmable Gate Array(s) (FPGA), integrated circuit(s), Application Specific Integrated Circuit(s) (ASIC), or any combination thereof. Furthermore, it is understood that a single a processing circuit may be equivalently split into two separate processing circuits, and conversely that two separate processing circuits may be combined into a single equivalent processing circuit.

As used herein, "memory" may be understood as an electrical component in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, it is appreciated that registers, shift registers, processor registers, data buffers, etc., are also embraced herein by the term memory. It is appreciated that a single component referred to as "memory" or "a memory" may be composed of more than one different type of memory, and thus may refer to a collective component comprising one or more types of memory. It is readily understood that any single memory component may be separated into multiple collectively equivalent memory components, and vice versa. Furthermore, it is appreciated that while memory may be depicted, such as in the drawings, as separate from one or more other components, it is understood that memory may be integrated within another component, such as on a common integrated chip.

The term "base station" used in reference to an access point of a mobile communication network may be understood as a macro base station, micro base station, Node B, evolved NodeBs (eNB), Home eNodeB, Remote Radio Head (RRH), relay point, etc.

As used herein, a "cell" in the context of telecommunications may be understood as a sector served by a base station. Accordingly, a cell may be a set of geographically co-located antennas that correspond to a particular sectorization of a base station. A base station may thus serve one or more cells (or sectors), where each cell is characterized by a distinct communication channel. Furthermore, the term "cell" may be utilized to refer to any of a macrocell, microcell, femtocell, picocell, etc.

It is appreciated that the ensuing description may detail exemplary scenarios involving mobile device operating according to certain 3GPP (Third Generation Partnership Project) specifications, notably Long Term Evolution (LTE) and Long Term Evolution-Advanced (LTE-A). It is understood that such exemplary scenarios are demonstrative in nature, and accordingly may be similarly applied to other mobile communication technologies and standards, such as WLAN (wireless local area network), WiFi, UMTS (Universal Mobile Telecommunications System), GSM (Global System for Mobile Communications), Bluetooth, CDMA (Code Division Multiple Access), Wideband CDMA (W-CDMA), etc. The examples provided herein are thus understood as being applicable to various other mobile communication technologies, both existing and not yet formulated, particularly in cases where such mobile communication technologies share similar features as disclosed regarding the following examples.

For purposes of this disclosure, radio communication technologies may be classified as one of a Short Range radio communication technology, Metropolitan Area System radio communication technology, or Cellular Wide Area radio communication technology. Short Range radio communication technologies include Bluetooth, WLAN (e.g. according to any IEEE 802.11 standard), and other similar radio communication technologies. Metropolitan Area System radio communication technologies include Worldwide Interoperability for Microwave Access (WiMax) (e.g. according to an IEEE 802.16 radio communication standard, e.g. WiMax fixed or WiMax mobile) and other similar radio communication technologies. Cellular Wide Area radio communication technologies include GSM, UMTS, LTE, LTE-Advanced (LTE-A), CDMA, WCDMA, LTE-A, General Packet Radio Service (GPRS), Enhanced Data Rates for GSM Evolution (EDGE), High Speed Packet Access (HSPA), HSPA Plus (HSPA+), and other similar radio communication technologies.

The term "RAT system" as utilized herein refers to the hardware, software, and/or firmware components of a mobile device that support operation of at least one Radio Access Technology (RAT). A RAT system may thus include one or more microprocessors/microcontrollers and/or one or more processing circuits, where the one or more microprocessors/microcontrollers may be configured to execute program code for software and/or firmware modules to control the microprocessor/microcontrollers to operate in accordance with the protocol stack (Layer 2 and 3) and/or physical layers (Layer 1) of a particular radio access technology. The microprocessors/microcontrollers may be configured to control the one or more processing circuits and any additional components in accordance with control logic provided by the software/firmware modules defined in the program code. It is appreciated that the RAT systems for multiple RATs may be integrated, such as in the case of a multi-mode baseband modem configured to support operation of more than one RAT. Accordingly, one or more microprocessors/microcontrollers, processing circuits, and/or software/firmware modules may be shared between multiple RAT systems. Such may include unified protocol stacks (Layers 2 and 3) and/or unified physical layers (Layer 1). A multi-mode RAT system may thus refer to one or more microprocessors/microcontrollers and one or more processing circuits that cooperatively support multiple RATs, such as in accordance with master and slave RAT roles; however it is appreciated that the term "RAT system" encompasses both single- and multi-mode RAT systems. A RAT system configured for a specific radio access technology may be denoted as e.g. an LTE system, a UMTS system, a GSM system, etc. A baseband modem may be referred to as a RAT system; however it is appreciated that a multi-mode baseband modem may be composed of multiple RAT systems, e.g. at least one RAT system for each radio access technology supported by the baseband modem, where each RAT system in a multi-mode baseband modem may be discrete or integrated relative to the other RAT systems.

The term "network" as utilized herein, e.g. in reference to a communication network such as a mobile communication network, is intended to encompass both an access section of a network (e.g. a radio access network (RAN) section) and a core section of a network (e.g. a core network section).

As utilized herein, the term "radio idle mode" or "radio idle state" used in reference to a mobile terminal refers to a radio control state in which the mobile terminal is not allocated at least one dedicated communication channel of a mobile communication network. The term "radio connected mode" or "radio connected state" used in reference to a mobile terminal refers to a radio control state in which the mobile terminal is allocated at least one dedicated uplink communication channel of a mobile communication network.

Unless explicitly specified, the terms "transmit" and "send" encompass both direct and indirect transmission/sending. Similarly, the term "receive" encompasses both direct and indirect reception unless explicitly specified.

Long Term Evolution (LTE) Release 9 as specified by the 3$^{rd}$ Generation Partnership Project (3GPP) has introduced Observed Time Different of Arrival (OTDOA) positioning as a mechanism to determine the geographical location of a UE. In an OTDOA procedure, the serving cell of a UE may provide the UE with an OTDOA neighbor cell list containing up to 24 OTDOA cells for a UE to obtain RSTD measurements for. The UE may then receive Positioning Reference Signals (PRSs) from each of the OTDOA neighbor cells in addition to an OTDOA reference cell to measure the Time of Arrival (TOA) of the PRS for each positioning measurement cell. The UE may then determine Reference Signal Time Difference (RSTD) measurements from the obtained OTDOA neighbor and reference cell TOAs that indicate the difference in TOA between a PRS received from the OTDOA reference cell of the positioning measurement cells and a PRS received from one of the OTDOA neighbor cells. The UE may then report the obtained RSTD measurements to the serving cell, which may estimate the geographic location based on the RSTD measurements and known geographical information about each of the positioning measurement cells.

FIG. 1 shows an exemplary network scenario illustrating an OTDOA procedure. Mobile communication network 100 depicted in FIG. 1 may include base stations (eNodeBs in accordance with an LTE context) 104, 106, 108, and 110 in addition to UE 102. Although the following description may largely be directed towards an LTE network context, it is understood that the description is demonstrative in nature and may be readily applied to various other radio communication technologies, such as e.g. any Cellular Wide Area radio communication technology, in particular any radio communication technology capable of estimating mobile terminal position based on measured relative difference in arrival of downlink signals.

Each of base stations 104-110 may be composed of respective cells 104a-104c, 106a-106c, 108a-108c, and 110a-110c (not separately depicted in FIG. 1). As shown in FIG. 1, the respective wireless channel between UE 102 and each of cells 104a-104c, 106a-106c, 108a-108c, and 110a-110c may be respectively denoted as wireless channels 114a-114c, 116a-116c, 118a-118c, and 120a-120c (not separately depicted in FIG. 1). While each of wireless channels 114a-120c are denoted in FIG. 1, each wireless channel may or may not be actively used for radio communications at any given point in time.

In the exemplary scenario of FIG. 1, UE 102 may be coupled to serving cell 104a of base station 104, and accordingly may exchange downlink and/or uplink data with serving cell 104a over wireless channel 112a, e.g. in a radio connected state.

Serving cell 104a may initiate an OTDOA procedure in order to estimate the geographical location of UE 102 based on reference signal measurements at UE 102. Accordingly, serving cell 104a may provide UE 102 with an OTDOA configuration, which may uniquely specify the parameters and target cells for UE 102 to perform the OTDOA procedure.

In an abridged overview of an OTDOA procedure as specified by 3GPP, LTE Positioning Protocol (LPP) server 130 may provide UE 102 via serving cell 104a with specific information detailing the OTDOA configuration, including identifying the PRS configuration (including PRS timing and frequency scheduling information), an OTDOA reference cell, and an OTDOA neighbor cell list for RSTD measurements. LPP server 130 may be located in a core network section of mobile communication network 100, and may be connected with base station 104 via core network interface 132, which may include one or more further core network components such as e.g. a Mobility Management Entity (MME, interfaced with base station 104 over an S1-U interface) or a Serving Gateway (S-GW, interfaced with base station 104 over an S1-MME interface). Regardless of the specific implementational structure of core network interface 132, LPP server 130 may be configured to communicate with UE 102 at least via base station 104 and wireless channel 114.

RSTD measurements in OTDOA procedures may rely on UE measurements of PRSs received from the both OTDOA reference cell and the cells of the OTDOA neighbor cell list, which are collectively referred to herein as positioning measurement cells (i.e. the OTDOA reference cell in addition to each cell of the OTDOA neighbor cell list) which collectively compose a positioning measurement cell list. Each positioning measurement cell may transmit a PRS pattern on the Physical Broadcast Channel (PBCH) using antenna port 6, where the specific Resource Element (RE) mapping for the PRS pattern is dependent upon a particular PRS bandwidth parameter $N_{RB}^{PRS}$ (the number of downlink Resource Blocks (RBs) allocated for the PRS pattern) and a cell-specific frequency shift $v_{shift}$ dependent on the Physical Cell ID (PCI) $N_{ID}^{cell}$ of each positioning measurement cell as specified in Section 6.10.4.2 of the 3GPP Technical Specification TS 36.255 "Evolved Universal Terrestrial Radio Access (E-UTRA); Physical channels and modulation" V12.5.0 (Release 12) of March 2015 ("3GPP TS 36.211 (Release 12)").

Figure 2:
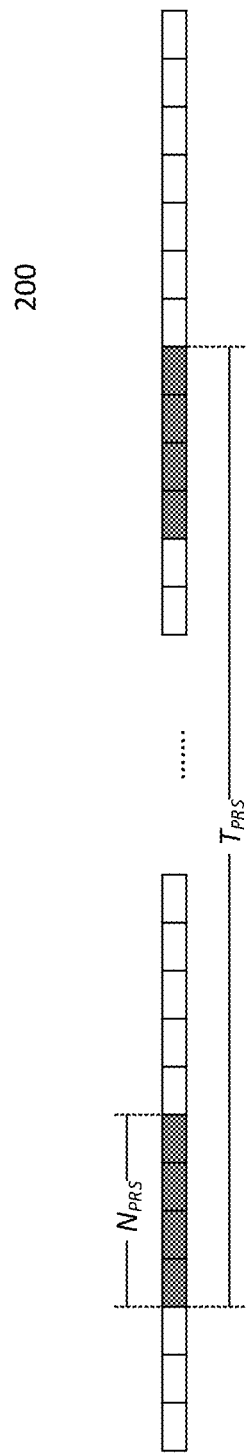
FIG. 2 shows a timing chart illustrating a reference signal scheduling pattern.

FIG. 2 shows timing chart 200 illustrating a downlink frame structure for an arbitrary positioning measurement cell, where each time unit of timing chart 200 is a downlink subframe of 1 ms duration in accordance with an LTE context (although such may analogously apply to the particular subframe length of other radio access technologies). As previously detailed, each positioning measurement cell may transmit a PRS pattern according to a specific PRS RE mapping. Additionally, each positioning measurement cell may transmit a PRS pattern over $N_{PRS}$ consecutive downlink subframes with a periodicity of $T_{PRS}$, where both $N_{PRS}$ and $T_{PRS}$ are specified in the prsInfo Information Element (IE) for each positioning measurement cell according to Section 6.5 of the 3GPP Technical Specification TS 36.355 "Evolved Universal Terrestrial Radio Access (E-UTRA); LTE Positioning Protocol (LPP)" V12.4.0 (Release 12) of March 2015 ("3GPP TS 36.355 (Release 12)"). Each block of $N_{PRS}$ downlink subframes containing a PRS pattern is referred to as a "PRS occasion", and accordingly each positioning measurement cell may transmit a PRS occasion containing $N_{PRS}$ downlink subframes each containing a PRS pattern every $T_{PRS}$ subframes. Additionally, each positioning measurement cell may synchronize PRS occasions with one another, where the PRS occasion transmitted by each positioning measurement cell is fully or partially aligned with the PRS occasions transmitted by the other positioning measurement cells (up to a half-subframe offset), where the offset (if any) for each OTDOA neighbor cell may be indicated relative to the OTDOA reference cell as part of the OTDOA neighbor cell list.

Accordingly, UE 102 may receive the requisite control signaling (e.g. as IEs) from LPP server 130 via serving cell 104a in order to obtain the OTDOA configuration, which UE 102 may utilize to identify the timing position of each PRS occasion. UE 102 may then perform RSTD measurements by measuring PRS occasions received from each of the positioning measurement cell list (OTDOA reference cell and OTDOA neighbor cells). Referring back to the exemplary scenario of mobile communication network 100 in FIG. 1, serving cell 104a may provide UE 102 with an OTDOA configuration that identifies cell 106a of base station 106 as the OTDOA reference cell and cells 106b-110c as the OTDOA neighbor cells in addition to the relevant cell information needed to identify and measure PRS patterns of each positioning measurement cell (cells 106a-110c). Serving cell 104a may additionally specify $N_{PRS}$ and $T_{PRS}$ in addition to further relevant OTDOA configuration parameters. Accordingly, UE 102 may apply the OTDOA configuration provided by serving cell 104a in order to measure PRS occasions of each of the positioning measurement cells 106a-110c. UE 102 may then obtain RSTD measurements by based on the Time of Arrival (TOA) of PRS occasions of OTDOA neighbor cells 106b-110c relative to OTDOA reference cell 106a, where the RSTD measurements are defined in Section 5.1.12 of the 3GPP Technical Specification TS 36.214 "Evolved Universal Terrestrial Radio Access (E-UTRA); Physical Layer Measurements" V12.2.0 (Release 12) of March 2015 ("3GPP TS 36.214 (Release 12)") as "[t]he relative timing difference between the [neighbor] cell j and the reference cell i, defined as $T_{SubframeRxj} - T_{SubframeRxi}$, where: $T_{SubframeRxj}$ is the time when the UE receives the start of one subframe from cell j [and] $T_{SubframeRxi}$ is the time when the UE receives the corresponding start of one subframe from cell i that is closest in time to the subframe received from cell j". UE 102 may then report back the RSTD measurements to LPP server 130 via serving cell 104a.

UE 102 may thus be able to obtain an RSTD measurement for each OTDOA neighbor cell during a given PRS occasion, e.g. by comparing the TOA of each OTDOA neighbor cell with the TOA of the OTDOA reference cell to identify the subframe time difference. However, in particular for OTDOA neighbor cells that have poor wireless channel quality (e.g. for wireless channels 116b-120c), UE 102 may not be able to obtain sufficiently accurate RSTD measurements with only one PRS occasion. For example, UE 102 may be able to improve RSTD measurement accuracy by performing multiple RSTD measurements for each OTDOA neighbor cell, i.e. spread over multiple PRS occasions, and aggregating the RSTD measurements for each OTDOA neighbor cell to increase estimation accuracy, such as by averaging RSTD measurements or selecting certain RSTD measurements with higher accuracy.

Accordingly, each OTDOA procedure may provide multiple PRS occasions, thus allowing UE 102 to obtain multiple RSTD measurements for each OTDOA neighbor cell. Depending on $T_{PRS}$ and the relative frequencies of each positioning measurement cell (i.e. if any inter-frequency RSTD measurements are necessary), each OTDOA procedure may provide M total PRS occasions where M=8, 16, or 32 as specified in Sections 8.1.2.5-8.1.2.4 of the 3GPP Technical Specification TS 36.133 "Evolved Universal Terrestrial Radio Access (E-UTRA); Requirements for support of radio resource management" V13.1.0 (Release 13) of September 2015 ("3GPP TS 36.133 (Release 13)").

Accordingly, UE 102 may thus have a finite number M of PRS occasions to utilize to perform RSTD measurements for each OTDOA neighbor cell during a given OSDTOA procedure. Such may allow for UE 102 to obtain more accurate RSTD measurements by aggregating multiple RSTD measurements for each OTDOA neighbor cell, such as by combining multiple RSTD measurements (e.g. averaging or weighted averaging), selecting the most accurate measurements, selecting a median, etc.

LPP server 130 may assign up to 24 OTDOA neighbor cells to UE 102 to obtain RSTD measurements. UE 102 may therefore have M PRS occasions to perform RSTD measurements for $N_{ncell}$ OTDOA neighbor cells, where $N_{ncell}$ is an integer less than or equal to 24. Furthermore, as detailed above regarding the calculation of RSTD measurements as specified in 3GPP TS 36.214 (Release 12), UE 102 may need to measure the TOA of an OTDOA neighbor cell and the TOA of the OTDOA reference cell. Accordingly, UE 102 may need to perform a TOA measurement for the OTDOA reference cell for each PRS occasion order to calculate RSTD measurements for the OTDOA neighbor cells in a given PRS occasion.

Figure 3:
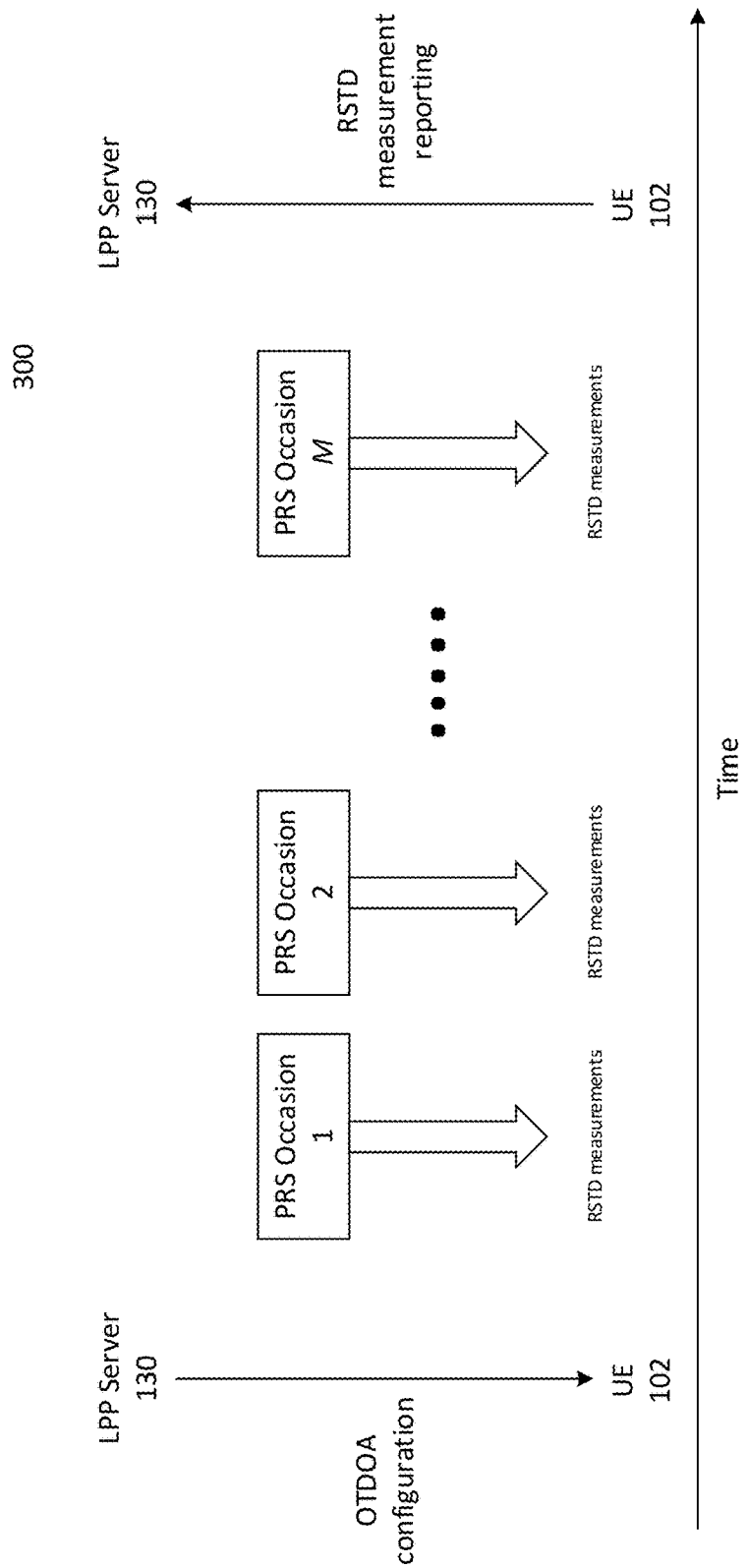
FIG. 3 shows a timing chart illustrating an OTDOA measurement and reporting procedure.

FIG. 3 shows timing chart 300 detailing an OTDOA procedure. LPP server 130 may first transmit an OTDOA configuration (OTDOA reference cell, OTDOA neighbor cell list, PRS configuration, etc.) to UE 102 (e.g. via core network interface 132, base station 104/serving cell 104a, and wireless channel 114a). UE 102 may receive and process the OTDOA configuration in order to determine the parameters to be used in RSTD measurement and reporting.

UE 102 may then perform RSTD measurements on the $N_{ncell}$ OTDOA neighbor cells (up to 24 total, e.g. OTDOA neighbor cells 106b-110c in FIG. 1) and subsequently report the RSTD measurements back to LPP server 130 following the conclusion of the M PRS occasions. In a straightforward approach, UE 102 may measure each of the $N_{ncell}$ OTDOA neighbor cells during each PRS occasion, i.e. by performing up to 24 RSTD measurements during each of the M PRS occasions depending on the value of $N_{ncell}$. However, depending on the particular implementation of UE 102, the measurement capabilities of UE 102 may not be sufficient to measure all of the up to 24 OTDOA neighbor cells during each PRS occasion. Additionally, performing up to 24 RSTD measurements may require substantial processing power in order to process an RSTD measurement for each OTDOA neighbor cell, which may have a high power penalty for UE 102. Accordingly, UE 102 may instead select to only measure some of the OTDOA neighbor cells during each PRS occasion, such as by measuring e.g. 4, 5, 6, 8, etc. OTDOA neighbor cells during each PRS occasion. UE 102 may therefore conserve power at the expense of sacrificing some accuracy in the reported RSTD measurement for each OTDOA neighbor cell, as the number of raw measurements contributing to a reported RSTD measurement is directly proportional to reported RSTD measurement accuracy.

UE 102 may therefore uniformly distribute the OTDOA neighbor cells across the M available PRS occasions. For example, in an exemplary scenario where M=8 and $N_{ncell}$=24 (i.e. LDD server 130 specifies 24 OTDOA neighbor cells), UE 102 may measure OTDOA neighbor cells 1-6 during PRS Occasion 1, OTDOA neighbor cells 7-12 during PRS Occasion 2, . . . OTDOA neighbor cells 18-24 during PRS Occasion 4, OTDOA neighbor cells 1-6 during PRS Occasion 5 (second RSTD measurement for OTDOA neighbor cells 1-6), OTDOA neighbor cells 7-12 during PRS Occasion 6 (second RSTD measurement for OTDOA neighbor cells 7-12), etc. Accordingly, in such an exemplary scenario UE 102 may obtain two RSTD measurements for each OTDOA neighbor cell, where the total number of RSTD measurements for each OTDOA neighbor cell may depend on M, the number of OTDOA neighbor cells $N_{ncell}$, and the number of RSTD measurements UE 102 is configured to perform in parallel per PRS occasion $N_{parallel}$ (i.e. the number of OTDOA neighbor cells for which UE 102 can obtain RSTD measurements for in parallel).

While measuring only some of the OTDOA neighbor cells during each PRS occasion may conserve power, it may not be optimal to uniformly distribute the finite number of possible RSTD measurements (i.e. $M \cdot N_{parallel}$, the total number of PRS occasions M multiplied by the number of parallel RSTD measurements per PRS occasion $N_{parallel}$) between each of the $N_{ncell}$ OTDOA neighbor cells. For example, when LPP server 130 assigns the OTDOA neighbor cell list to UE 102, there is no guarantee that all $N_{ncell}$ OTDOA neighbor cells will be detectable by UE 102. Accordingly, the OTDOA neighbor cell list may contain one or more "dummy" cells, i.e. OTDOA neighbor cells that are undetectable to UE 102 due to poor channel quality (e.g. caused by excessive distance from UE 102, excessive noise or interference, etc.). As RSTD measurement accuracy may depend on channel quality, i.e. poor channel quality may lead to inaccurate or even unusable RSTD measurements, UE 102 may not be able to obtain any meaningful RSTD measurements from such dummy cells. Consequently, it may be a waste of time and computational power for UE 102 to perform numerous RSTD measurements for dummy cells due to the improbability of obtaining a useable RSTD measurement.

Furthermore, the OTDOA neighbor cell list may contain one or more "strong" cells, i.e. OTDOA neighbor cells that have very strong channel quality. Due to the aforementioned dependence of RSTD measurements on channel quality, UE 102 may be able to obtain highly accurate RSTD measurements for such "strong" cells with a limited number or even a single RSTD measurement. Similar to dummy cells, it may be a waste of time and computational power for UE 102 to allocate many of the finite number of possible RSTD measurements for repeated RSTD measurements of strong cells.

Accordingly, UE 102 may optimize the OTDOA procedure by dynamically selecting which of the $N_{ncell}$ OTDOA neighbor cells to perform RSTD measurements on. For example, UE 102 may minimize RSTD measurements on strong and dummy cells while allocating the resulting "extra" measurements to measure "weak" cells, i.e. OTDOA neighbor cells that are not strong or dummy cells, which may be detectable OTDOA neighbor cells that have relatively poor channel conditions compared to strong cells. By allocating more of the finite RSTD measurements to measure such weak cells, UE 102 may be able to obtain more RSTD measurements for each weak cell, and accordingly may increase the accuracy of the reported RSTD measurements for each weak cell by aggregating multiple RSTD measurements together. UE 102 may thus conserve power compared to an approach that measures each OTDOA neighbor cell during each PRS occasion while improving weak cell RSTD measurement accuracy compared to an approach that distributes the fine RSTD measurements uniformly between each OTDOA neighbor cell.

Figure 4:
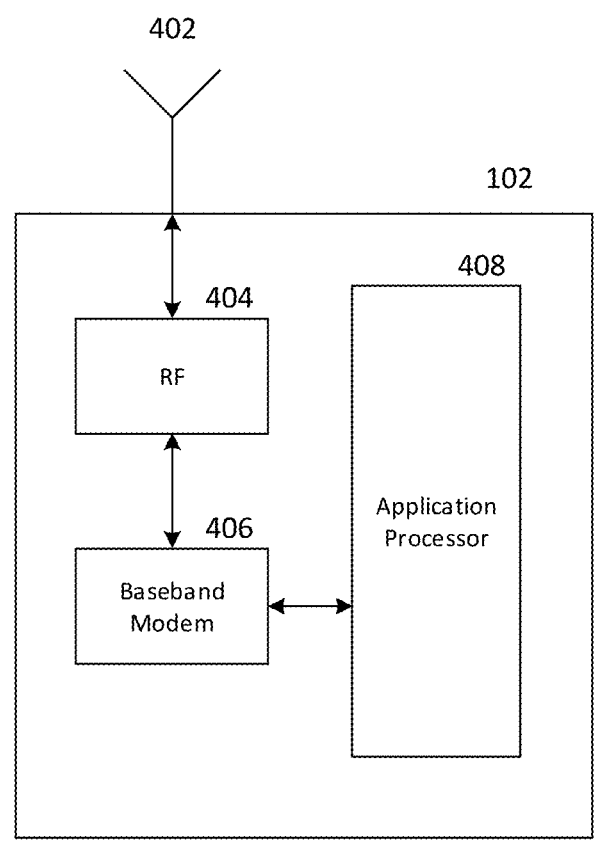
FIG. 4 shows a block diagram illustrating an internal configuration of a mobile terminal.

FIG. 4 shows a block diagram illustrating an internal configuration of UE 102. As will be detailed, UE 102 may be configured to adaptively classify OTDOA neighbor cells of the OTDOA neighbor cell list and dynamically select OTDOA neighbor cells to perform RSTD measurements for during the available PRS occasions, such as by using channel quality metrics to classify OTDOA neighbor cells.

As illustrated in FIG. 4, UE 102 may include antenna 402, radio frequency (RF) transceiver 404, baseband modem 406, and application processor 408. As shown in FIG. 4, the aforementioned components of UE 102 may be implemented as separate components. However, it is appreciated that the architecture of UE 102 depicted in FIG. 4 is for purposes of explanation, and accordingly one or more of the aforementioned components of UE 102 may be integrated into a single equivalent component or divided into two separate components with collective equivalence. It is understood that UE 102 may have one or more additional components, such as additional hardware, software, or firmware elements. For example, UE 102 may further include various additional components including processors/microprocessors, controllers/microcontrollers, memory, other specialty or generic hardware/processors/circuits, etc., in order to support a variety of additional operations. UE 102 may also include a variety of user input/output devices (display(s), keypad(s), touchscreen(s), speaker(s), external button(s), camera(s), microphone(s), etc.), peripheral device(s), memory, power supply, external device interface(s), subscriber identify module(s) (SIM) etc.

As will be detailed, in an aspect of the disclosure UE 102 may be a mobile terminal device having a radio processing circuit (RF transceiver 404) and a baseband processing circuit (baseband modem 406) adapted to interact with the radio processing circuit. The baseband processing circuit may be configured obtain a plurality of channel quality metrics for the plurality of cells, assign a plurality of cell measurement priority rankings to the plurality of cells based on the plurality of channel quality metrics of the plurality of target cells, based on the plurality of cell measurement priority rankings, select one or more target cells of the plurality of cells to measure during one or more reference signal periods to obtain a plurality of reference signal measurements, and report the plurality of reference signal measurements to a communication network. In a further aspect of the disclosure, UE 102 may be a mobile communication device having an RF transceiver (RF transceiver 404) and a baseband processing circuit (406) adapted to interact with the RF transceiver to transmit and receive radio signals on a communication network, the baseband processing circuit configured to identify a plurality of reference signal time periods allocated for cell measurement, obtain a plurality of channel quality metrics for a plurality of cells, for each of the plurality of reference signal time periods, select one or more target cells from the plurality of cells to measure and exclude one or more remaining cells of the plurality of cells from measurement based on the plurality of channel quality metrics, and report a plurality of reference signal measurements obtained during the plurality of reference signal time periods to a communication network.

In an abridged overview of the operation of UE 102, UE 102 may be configured to receive and/or transmit wireless signals according to multiple different wireless access protocols or radio access technologies (RATs), including any one or combination of LTE (Long Term Evolution), WLAN (wireless local area network), WiFi, UMTS (Universal Mobile Telecommunications System), GSM (Global System for Mobile Communications). Bluetooth, CDMA (Code DivisionMultiple Access), Wideband CDMA (W-CDMA), etc. The RAT capabilities of UE 102 may be determined by e or more Subscriber Identity Modules (SIM) included in UE 102 (not explicitly shown in FIG. 1). It is appreciated that separate components may be provided for each distinct type of compatible wireless signals, such as a dedicated LTE antenna. LTE RF transceiver and dedicated LTE baseband for LTE reception and transmission, a dedicated UMTS antenna, UMTS RF transceiver and UMTS baseband modern, a dedicated WiFi antenna, WiFi RF transceiver, and WiFi baseband modern for WiFI reception and transmission, etc., in which case antenna 402, RF transceiver 404, and baseband modem 406 may each respectively be an antenna system, RF transceiver system, and a baseband modem system composed of the individual dedicated components. Alternatively, ogre or more components of UE 102 may be shared between different wireless access protocols, as e.g. by sharing antenna 402 between multiple different wireless access protocols, e.g. by using a common RF transceiver 404 shared between multiple wireless access protocols, e.g. a common baseband modem 406 shared between multiple wireless access protocols, etc. In an exemplary aspect of disclosure, RF transceiver 404 and/or baseband modem 406 may be operate according to multiple mobile communication access protocols (i.e. "multi-mode"), and thus may be configured to support one or more of LTE, UMTS, and/or GSM access protocols.

Further to the abridged overview of operation of UE 102, RF transceiver 404 may receive radio frequency wireless signals via antenna 402, which may be implemented as e.g. a single antenna or an antenna array composed of multiple antennas. RF transceiver 404 may include various reception circuitry components, which may include analog circuitry configured to process externally received signals such as e.g. mixing circuitry to convert externally received RF signals to baseband and/or intermediate frequencies. RF transceiver 404 may also include amplification circuitry to amplify externally received signals, such as power amplifiers (PAs) and/or Low Noise Amplifiers (LNAs), although it is appreciated that such components may also be implemented separately. RF transceiver 404 may additionally include various transmission circuitry components configured to transmit internally received signals, such as e.g. baseband and/or intermediate frequency signals provided by baseband modem 406, which may include mixing circuitry to modulate internally received signals onto one or more radio frequency carrier waves and/or amplification circuitry to amplify internally received signals before transmission. RF transceiver 404 may provide such signals to antenna 402 for wireless transmission. Further references herein to reception and/or transmission of wireless signals by UE 102 may thus be understood as an interaction between antenna 402, RF transceiver 404, and baseband modem 406 as detailed above. Although not explicitly depicted in FIG. 4, RF transceiver 404 may be additionally be connected to application processor 408.

Figure 5:
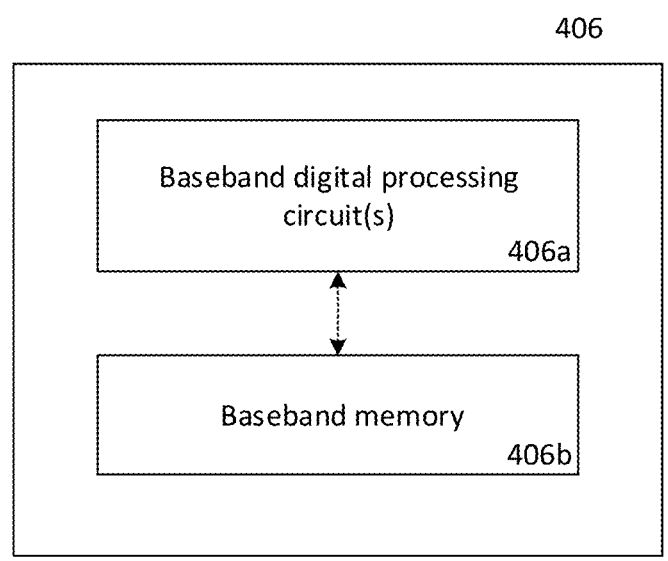
FIG. 5 shows a block diagram illustrating an internal configuration of a baseband modem.

FIG. 5 shows a block diagram illustrating an internal configuration of baseband modem 406 according to an aspect of the disclosure. Baseband modem 406 may include baseband digital processing circuit(s) 406a (one or more digital processing circuits) and baseband memory 406b. Although not explicitly shown in FIG. 5, baseband modem 406 may contain one or more additional components, including e.g. one or more analog or mixed-signal processing circuits.

Baseband digital processing circuit(s) 406a may be composed of various processing circuitry configured to perform baseband (herein also including "intermediate") frequency processing, such as Analog to Digital Converters (ADCs) and/or Digital to Analog Converters (DACs), modulation/demodulation circuitry, encoding/decoding circuitry, audio codec circuitry, digital signal processing circuitry, etc. Baseband digital processing circuit(s) 406a may include hardware, software, or a combination of hardware and software (e.g. as executed on a processor). Specifically, baseband digital processing circuit(s) 406a of baseband modem 406 may include one or more logic circuits, processors, microprocessors, controllers, microcontrollers, scalar processors, vector processors, Central Processing Units (CPU), Graphics Processing Units (GPU) (including General-Purpose Computing on GPU (GPGPU)), Digital Signal Processors (DSP), Field Programmable Gate Arrays (FPGA), integrated circuits, Application Specific Integrated Circuits (ASIC), etc., or any combination thereof.

Baseband digital processing circuit(s) 406a may include a control circuit configured to control one or more other digital processing circuits of baseband digital processing circuit(s) 406a in addition to further components of UE 102. For example, the control circuit may be adapted to control one or more other digital processing circuits in accordance with control logic provided by a protocol stack, such as a GSM protocol stack, a UMTS protocol stack, an LTE protocol stack, etc. The control circuit may be a protocol processor configured to execute protocol stack software and/or firmware modules by retrieving corresponding program code from baseband memory 406b (or e.g. another memory component accessible by the control circuit) and operating in accordance with control logic provided by the protocol stack software and/or firmware modules. Although not limited to such, the control circuit may be configured to execute Layer 3, Layer 2, and Layer 1 (Physical or "PHY" layer) protocol stack software and/or firmware modules in order to control other digital processing circuits of baseband digital processing circuit(s) 406a (e.g. PHY layer processing circuits) in addition to RF transceiver 404 and antenna 402 in order to transmit and receive radio communication signals in accordance with the corresponding protocol stack.

Baseband modem 406 may be a unified "single mode" modem, i.e. may only be configured to operate according to a protocol stack for a single radio access technology. Alternatively, baseband modem 406 may be a unified "multi-mode" mode, i.e. may be configured to operate according to separate protocol stacks for multiple radio access technologies, such as in accordance with master RAT and slave RAT roles. Alternatively, baseband modem 406 may be composed of one or more discrete single mode or multi-mode modems, and may accordingly be configured to operate according to multiple protocol stacks in accordance with the radio access technology capabilities of each discrete modem. It is thus appreciated that while baseband modem 406 is shown a single component in 406, baseband modem 406 may be implemented as multiple separate components (e.g. multiple discrete baseband modems). Digital processing circuit(s) 106a may thus include one or more control circuits, which may each be capable of executing one or more protocol stack instances in order to control one or more shared or dedicated digital processing circuits of baseband digital processing circuit(s) 406a.

Baseband memory 406b may include volatile and/or non-volatile memory, including random access memory (RAM), read-only memory (ROM), flash memory, solid-state storage, magnetic tape, hard disk drive(s), optical drive(s), register(s), shift register(s), processor register(s), data buffer(s) etc., or any combination thereof. Baseband memory 406b may be configured to store software elements, which may be retrieved and executed using a processor component of baseband digital processing circuit(s) 406a. Although depicted as a single component in FIG. 4, baseband memory 406b may be implemented as one or more separate components in baseband modem 406. Baseband memory 406b may also be partially or fully integrated with baseband digital processing circuit(s) 406a.

As will be detailed, baseband modem 406 may include one or more digital processing circuits (baseband digital processing circuit(s) 406a) and a memory (baseband memory 406b). Baseband modem 406 may be configured to obtain a plurality of channel quality metrics for the plurality of cells, assign a plurality of cell measurement priority rankings to the plurality of cells based on the plurality of channel quality metrics of the plurality of target cells, based on the plurality of cell measurement priority rankings, select one or more target cells from the plurality of cells to measure during one or more reference signal periods to obtain a plurality of reference signal measurements, and report the plurality of reference signal measurements to a communication network.

Application processor 408 may be implemented as a Central Processing Unit (CPU), and may be configured to execute various applications and/or programs of UE 102, such as e.g. applications corresponding to program code stored in a memory component of UE 102 (not explicitly shown in FIG. 4). Application processor 408 may also be configured to control one or more further components of UE 102, such as user input/output devices (display(s), keypad(s), touchscreen(s), speaker(s), external button(s), camera(s), microphone(s), etc.), peripheral devices, memory, power supply, external device interfaces, etc.

Although baseband modem 406 and application processor 408 are depicted separately in FIG. 4, it is appreciated that this illustration is not limiting in nature. Accordingly, it is understood that baseband modem 406 and application processor 408 may be implemented separately, implemented together (i.e. as an integrated unit), or partially implemented together.

In order to optimize the OTDOA procedure, UE 102 may rank each of the $N_{ncell}$ OTDOA neighbor cells based on a channel quality metric, and selectively allocate each available parallel RSTD measurement (i.e. $N_{parallel}$) for each of the M PRS occasions based on the classification. For example, UE 102 may select which of the $N_{ncell}$ OTDOA neighbor cells to perform RSTD measurements for during each of the M PRS occasions based on channel quality metrics obtained for each of the $N_{ncell}$ OTDOA neighbor cells, and accordingly may perform RSTD for only some of the $N_{ncell}$ OTDOA neighbor cells that are highly ranked, i.e. exhibit strong channel quality. UE 102 may utilize a dynamic ranking that UE 102 may update based on new channel quality metrics, such as by periodically performing channel quality measurements in order to obtain new channel quality metrics for each OTDOA neighbor cell and updating the ranking based on the new channel quality metrics.

UE 102 may classify the OTDOA neighbor cells as part of the ranking procedure, such as by classifying OTDOA neighbor cells as unmeasured cells, strong cells, weak cells, or dummy cells as previously introduced. UE 102 may then highly rank unmeasured cells and weak cells while assigning low rankings to strong and dummy cells. In doing so, UE 102 may ensure both that unmeasured cells are measured and subsequently classified as soon as possible and that weak cells are measured more often than strong cells and dummy cells. UE 102 may therefore obtain more accurate RSTD measurements for weak cells as while minimizing the number of measurements on strong and dummy cells, which may be inefficient to repeatedly measure.

Figure 6:
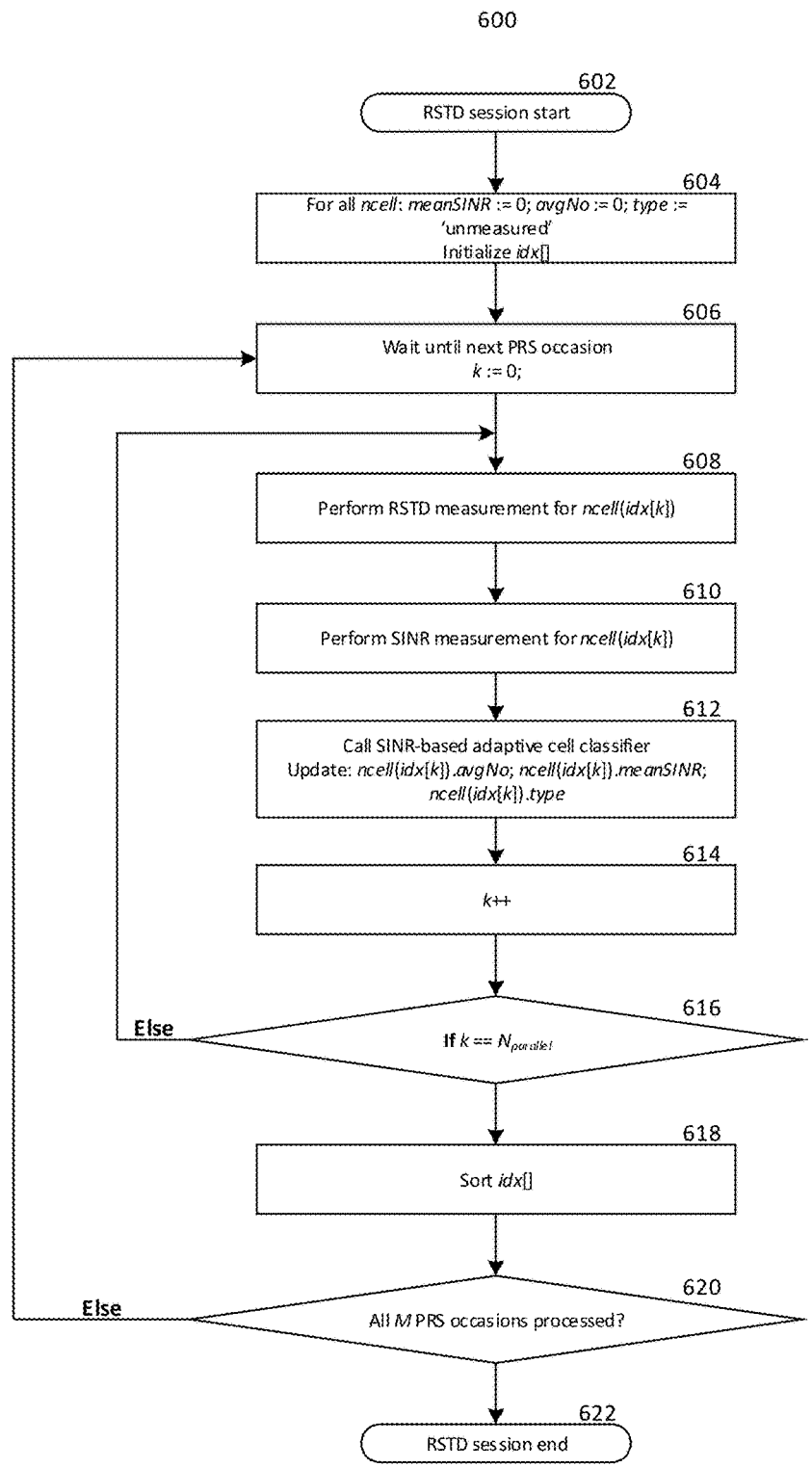
FIG. 6 shows a flow chart illustrating an optimized OTDOA measurement and reporting procedure.

The optimized OTDOA procedure will now be explained regarding method 600 as shown in FIG. 6. Baseband modem 406 may execute method 600 using baseband digital processing circuit(s) 406a and baseband memory 406b, such as by executing protocol stack software and/or firmware modules at a control circuit of baseband modem 406a in order to control baseband digital processing circuit(s) 406a to operate in accordance with control logic provided by the protocol stack software and/or firmware modules. The control circuit may also control further components of baseband digital processing circuit(s) 406a, such as an RSTD measurement circuit, SINR measurement circuit, and/or other PHY layer circuitry in order to obtain measurements and perform processing on the obtained measurements.

The RSTD session may being at 602, at which point baseband modem 406 may have received the OTDOA configuration from LDD server 130 including the OTDOA neighbor cell list, the OTDOA reference cell, and the PRS configuration as detailed above. Baseband modem 406 may thus obtain an array of OTDOA neighbor cells ncell of length $N_{ncell}$, i.e. the number of OTDOA neighbor cells specified by LDD server 130, and may determine the number of PRS occasions M. The element order of each of the OTDOA neighbor cells within ncell may be any arbitrary ordering, such as based on Physical Cell Identity (PCI) or random. Baseband modem 406 may also identify the OTDOA reference cell, which baseband modem 406 may need to perform a TOA measurement on during each PRS occasion in order to provide a reference TOA for determining the RSTD measurement for each OTDOA neighbor cell.

As previously indicated, baseband modem 406 may additionally be configured to perform up to $N_{parallel}$ RSTD measurements in parallel during each PRS occasion. Accordingly, baseband modem 406 may be capable of performing $M \cdot N_{parallel}$ RSTD measurements during the RSTD session.

Baseband modem 406 may initialize parameters at 604, which may include initializing OTDOA neighbor cell array ncell. Each element of ncell may be a data structure containing information of a particular OTDOA neighbor cell, which baseband modem 406 may store in baseband memory 406a. Each element of ncell may have meanSINR, avgNo, and type fields, which baseband modem 406 may initially set to 0, 0, and 'unmeasured', respectively. As will be detailed, each element of ncell may additionally have cell-specific adaptThH and adaptThL fields, which may be utilized for SINR-based adaptive cell classification. adaptThH and adaptThL may by initialized based on precalibrated adaptive thresholds, which may depend on the employed SINR measurement procedure (as will be detailed regarding FIG. 9). Baseband modem 406 may additionally include an RSTD measurement (or TOA measurement array) or an SINR measurement array for each element of ncell.

Baseband modem 406 may additionally initialize idx, which is an integer vector of length $N_{ncell}$ that baseband modem 406 may apply in order to "rank" each OTDOA neighbor cell. As will be later detailed, baseband modem 406 may iterate through ncell by accessing ncell(idx[k]), ncell(idx[k+1]), ncell(idx[k+2]), etc. Accordingly, idx[0] may be an integer equal to the index value of the "highest-ranked" OTDOA neighbor cell, while idx[$N_{ncell}-1$] may be an integer equal to the index value of the "lowest-ranked" OTDOA neighbor cell. It is appreciated that baseband modem 406 may analogously employ a pointer array or an implementation of ncell as a re-orderable data collection in order to rank each element of ncell.

Accordingly, in the absence of any applicable ranking data baseband modem 406 may simply initialize idx to [0, 1, 2, . . . , $N_{ncell}$-1], which may cause baseband modem 406 to perform RSTD measurements for OTDOA neighbor cells ncell(0) through ncell($N_{parallel}$-1) during the first PRS occasion. However, other initializations for idx are possible if baseband modem 406 wishes to perform RSTD measurements on certain OTDOA neighbor cells before performing RSTD measurements on other OTDOA neighbor cells.

Baseband modem 406 may then wait for the next PRS occasion at 606, which baseband modem 406 may identify in time based on the PRS configuration. Baseband modem 406 may additionally initialize the internal variable k to zero, which baseband modem 406 may utilize for loop tracking.

Baseband modem 406 may then begin the PRS occasion loop composed of 608-614 in 608, which may be repeated $N_{parallel}$ times per PRS occasion until baseband modem 406 has obtained RSTD measurements for each of the $N_{ncell}$ OTDOA neighbor cells during a given PRS occasion. Starting in 608 of the PRS occasion loop, baseband modem 406 may then perform an RSTD measurement for ncell(idx[k]), where ncell(idx[k]) is the top-ranked OTDOA neighbor cell according to the ranked index vector idx[k]. As baseband modem 406 may initially not rank any of the cells, the first iteration of PRS occasion loop 608-614 may simply iterate through the first $N_{parallel}$ OTDOA cells with no prior ranking (i.e. as idx was initialized to [0, 1, 2, . . . , $N_{ncell}$-1]). As previously indicated, each RSTD measurement may include obtaining a TOA measurement for ncell(idx[k]) and comparing the obtained TOA to a measured TOA for the OTDOA reference cell (as detailed above regarding 3GPP TS 36.214 (Release 12)), which baseband modem 406 may additionally need to measure at least once per each PRS occasion.

Baseband modem 406 may then perform a Signal-to-Interference plus Noise (SINR) measurement for ncell(idx[k]) in 610. As previously indicated, baseband modem 406 may apply any established SINR measurement procedure to obtain the SINR measurement for ncell(idx[k]), which may include processing at a PHY layer measurement circuit of baseband digital processing circuit(s) 406a.

Accordingly, baseband modem 406 may obtain an RSTD measurement and an SINR measurement for ncell(idx[k]) in 608 and 610. Baseband modem 406 may apply any established RSTD and SINR measurement procedure to respectively obtain the RSTD and SINR measurements. Additionally, 608-610 may be performed in any order, or e.g. even in parallel given parallel processing capability in baseband modem 406 (e.g. in PHY layer measurement circuitry of baseband digital processing circuit(s) 406a).

After obtaining the RSTD and SINR measurement for ncell(idx[k]) in 610, baseband modem 406 may call the SINR-based adaptive cell classifier for ncell(idx[k]), which will be described later in greater detail. As previously indicated, baseband modem 406 may dynamically classify each OTDOA neighbor cell in order to select which OTDOA neighbor cells to perform RSTD measurements for. Accordingly, baseband modem 406 may sort or "rank" the ranked index vector idx based on the dynamic cell classification, thus causing the top "ranked" OTDOA neighbor cells to be measured during each PRS occasion.

As previously indicated, certain OTDOA neighbor cells may have very weak wireless channels with UE 102. As RSTD measurements require a sufficiently strong channel, certain these OTDOA neighbor cells may not be able to produce any useful RSTD measurements, and may accordingly be classified as undetectable or "dummy" cells. In contrast, certain other OTDOA neighbor cells may have very strong wireless channels with UE 102, and as a result UE 102 may be able to obtain a very accurate RSTD measurement for such cells, i.e. classified as "strong" cells, with only one or several RSTD measurements.

The remaining OTDOA neighbor cells, i.e. OTDOA neighbor cells that are neither strong cells nor dummy cells, may be classified as "weak" cells. Such weak cells may have sufficiently strong wireless channels as to be reliably detected by UE 102 but may require multiple RSTD measurements in order to produce a RSTD measurement suitable for reporting.

Accordingly, UE 102 may be configured to minimize the number of RSTD measurements for strong and dummy cells while maximizing the number of RSTD measurements for weak cells. In order to do so, baseband modem 406 may attempt to quantitatively classify each OTDOA neighbor cell based on estimated channel quality. Specifically, UE 102 may obtain a channel quality metric, such as e.g. an SINR metric, for each OTDOA neighbor cell and subsequently classify each OTDOA neighbor cell as strong, weak, or dummy (i.e. the type field of each ncell). UE 102 may then sort ranked index vector idx after each PRS occasion in order to highly rank both cells that have not been measured at all, i.e. unmeasured cells, and weak cells while lowly ranking strong and dummy cells. In doing so, UE 102 may bias the RSTD measurement procedure toward performing as many RSTD measurements as possible for weak cells while performing relatively few RSTD measurements for strong and dummy cells.

In the context of method 600, baseband modem 406 may apply SINR measurements in order to classify each OTDOA neighbor cell. Accordingly, baseband modem 406 call the SINR-based adaptive cell classifier in 612 in order to update ncell(idx[k]).avgNo (number of SINR measurements for the classifier, as will be detailed), ncell(idx[k]).meanSINR (mean SINR value calculated from all the available SINR measurements for the cell, as will be detailed), and finally ncell(idx[k]).type, where ncell(idx[k]) is the final classification of 'weak', 'strong', or 'dummy' (initialized to 'unmeasured' prior to any SINR measurements).

After calling the SINR-based adaptive cell classifier in 612, baseband modem 406 may obtain a classification of 'weak', 'strong', or 'dummy' for ncell(idx[k]). Baseband modem 406 may then increment k++ in 614 in order to move to the next-highest-ranked ncell(idx[k]) based on the ranked index vector idx.

Baseband modem 406 may then determine in 616 whether k=$N_{parallel}$ (i.e. if baseband modem 406 has performed the maximum number of RSTD measurements for the current PRS occasion. If k does not equal $N_{parallel}$, baseband modem 406 may return to 608 to perform the RSTD measurements, SINR measurements, and SINR-based adaptive cell classification for t ncell(idx[k]) in 608-614, i.e. on the next-highest-ranked OTDOA neighbor cell according to ranked index vector idx. Furthermore, $N_{parallel}$ may not necessarily be limited to a locked value, and may optionally be dynamically adjusted by baseband modem 406 in order to measure more or less OTDOA neighbor cells per PRS occasion.

Baseband modem 406 may execute 608-614 on each ncell(idx[k]) until k=$N_{parallel}$ at 616, thus signaling the end of processing for the current PRS occasion. Baseband modem 406 may then sort ranked index vector idx in 618 in order to rank each of the OTDOA neighbor cells for measurement during the next PRS. As previously discussed, baseband modem 406 may rank the OTDOA neighbor cells to favor more RSTD measurements for weak cells and less RSTD measurements for strong and dummy cells. Additionally, baseband modem 406 may tank the OTDOA neighbor cells so that unmeasured cells are measured as soon as possible, i.e. are highest ranked.

Accordingly, baseband modem 406 may perform the ranked index vector sorting in 618 based on the type field for each OTDOA neighbor cell of ncell as determined by the SINR-based adaptive cell classification in 612.

Figure 7:
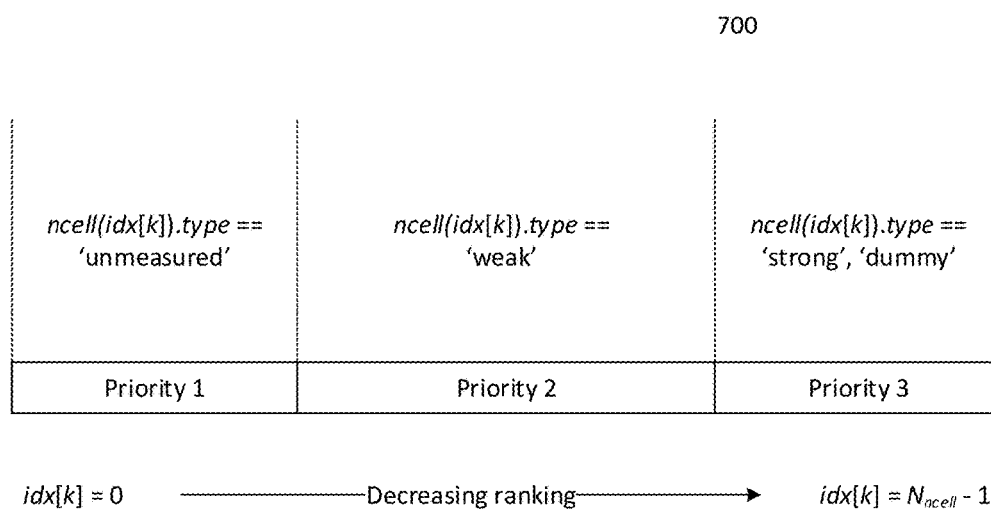
FIG. 7 shows a cell ranking scheme based on channel quality metrics.

FIG. 7 shows ranking chart 700 illustrating a potential ranking scheme for ranked index vector idx. Each element of idx may be an integer from zero to $N_{ncell}$, where each integer element of idx refers to a respective OTDOA neighbor cell of ncell. As shown in FIG. 7, idx[0] may refer to the OTDOA neighbor cell of ncell with the highest ranking, idx[1] to the OTDOA neighbor cell of ncell with the second-highest ranking, etc., while idx[$N_{ncell}$-1] may refer to the OTDOA neighbor cell of ncell with the lowest ranking. Accordingly, by incrementing k to iteratively process ncell(idx[k]) in 608-614 may cause baseband modem 406 to process the highest ranked OTDOA neighbor cell, second-highest ranked OTDOA neighbor cell, third-highest ranked OTDOA neighbor cell, etc., through the $N_{parallel}^{th}$-highest ranked OTDOA neighbor cell during each PRS occasion.

As baseband modem 406 may primarily favor performing RSTD measurements for unmeasured cells and secondarily favor performing RSTD measurements for weak cells as compared to strong and dummy cells, baseband modem 406 may sort idx[k] such that unmeasured cells of ncell are ranked highest, weak cells are ranked second-highest, and strong and dummy cells are ranked lowest as depicted in FIG. 7.

Accordingly, in 616 baseband modem 406 may assign idx[0]–idx[$N_{ncell\_un}$-1] (Priority 1 group) to respectively refer to the $N_{ncell\_un}$ unmeasured cells of ncell (i.e. where each idx[k] is the integer-valued index of the corresponding OTDOA neighbor cell within ncell), idx[$N_{ncell\_un}$]–idx[$N_{ncell\_un}$+$N_{ncell\_w}$-1] (Priority 2 group) to respectively refer to the $N_{ncell\_w}$ weak cells of ncell, and idx[$N_{ncell\_un}$+$N_{ncell\_w}$]–idx[$N_{ncell}$-1] (Priority 3 group) to respectively refer to the $N_{ncell\_d}$ dummy cells and $N_{ncell\_s}$ strong cells of ncell. Accordingly, baseband modem 406 may rank each of the OTDOA neighbor cells by sorting ranked index vector idx based the type field of each element of ncell.

It is appreciated that other ranking procedures may be utilized in order to perform the ranking in 616. For example, baseband modem 406 may utilize a pointer array where each pointer in the array points to a memory location of a respective element in ncell, or may alternatively re-order ncell as a "collection"-type data structure in order to apply the ranking. Regardless, it is appreciated that baseband modem 406 may be configured to rank or sort the OTDOA neighbor cells based on type. Baseband modem 406 may also apply different ranking criteria as will be later detailed.

After sorting ranked index vector idx in order to rank each of the OTDOA neighbor cells for measurement, baseband modem 406 may proceed to 620 to determine if all M PRS occasions have already been processed.

Alternatively, if not all M PRS occasions have been processed, i.e. one or more PRS occasions still remain, baseband modem 406 may return to 606 to wait until the next PRS occasion, initialize loop variable k to zero, and perform 608-614 on the highest-ranked OTDOA neighbor cells according to ranked index vector idx as determined n 616. Accordingly, baseband modem 406 may obtain new RSTD and SINR measurements and call the SINR-based adaptive cell classifier for each measured OTDOA cell during the next PRS occasion. Baseband modem 406 may then repeat 618 in order to update ranked index vector idx based on the updated SINR-based adaptive cell classifications, and proceed to repeat 606-618 for any remaining PRS occasions.

Once all M PRS occasions have been processed in 620, baseband modem 406 may conclude the RSTD session at 622, such as by determining the final RSTD measurements for each OTDOA neighbor cell, selecting which OTDOA neighbor cells to report, and compiling and transmitting an OTDOA report to serving cell. As previously indicated, baseband modem 406 may improve the RSTD measurement accuracy for each OTDOA neighbor cell by aggregating together multiple RSTD measurements in order to determine the reported RSTD measurement for each OTDOA neighbor cell. Accordingly, baseband modem 406 may utilize each available RSTD measurement for each OTDOA neighbor cell (where the total number of available RSTD measurements for each OTDOA cell may vary from cell to cell due to the ranking) in order to determine the reported RSTD measurement. For example, baseband modem 406 may compute the average of all the RSTD measurements for each OTDOA neighbor cell in order to determine the reported RSTD measurement, or may compute the median value from the RSTD measurements for each OTDOA neighbor cell in order to determine the reported RSTD measurement. Alternatively, baseband modem 406 may compute an average or select a measurement of the RSTD measurements for each OTDOA neighbor cell based on channel quality. As previously indicated, cells with strong wireless channel quality may result in more accurate RSTD measurements while cells with poor wireless channel quality may result in inaccurate RSTD measurements. Accordingly, baseband modem 406 may compute a weighted average from the RSTD measurements where the weights are based on the SINR metrics (obtained in 610) for each RSTD metric, or may select an RSTD measurement corresponding to the highest SINR measurement as the reported RSTD measurement. It is understood that many such variations in determining the reported RSTD measurement are possible. Baseband modem 406 may additionally include an RSTD measurement array RSTD[ ] for each element of ncell containing the values of all obtained RSTD measurements (or alternatively), or may store the obtained RSTD measurements separately.

After obtaining the reported RSTD measurements, baseband modem 406 may compile an OTDOA report and transmit the OTDOA report to LPP server 130 via serving cell 104a, such as in accordance with reporting parameters specified in the OTDOA configuration. Baseband modem 406 may also need to include an RSTD quality metric that indicates the quality of each RSTD measurement, which may be based on obtained SINR measurements, e.g. via a direct or indirect SINR-to-RSTD quality metric mapping. Baseband modem 406 may not need to report each OTDOA neighbor cell in the OTDOA report, such as e.g. by only reporting neighbor cells with an SINR (e.g. meanSINR) greater than –13 dB (e.g. a "detectable" cell as specified by 3GPP). Baseband modem 406 may thus perform further analysis on the obtained RSTD measurements to determine which RSTD measurements are sufficiently accurate to report.

Accordingly, baseband modem 406 may optimize the OTDOA procedure by ranking the OTDOA neighbor cells during each PRS occasion in order to select which OTDOA neighbor cells to measure. By favoring unmeasured and weak cells over strong and dummy cells, baseband modem 406 may improve the accuracy of RSTD measurements for weak cells while limiting repeated unnecessary measurements of dummy cells (which may likely not produce useful RSTD measurements) and strong cells (which may only require one or a few RSTD measurements to obtain an accurate RSTD measurement).

Figure 8:
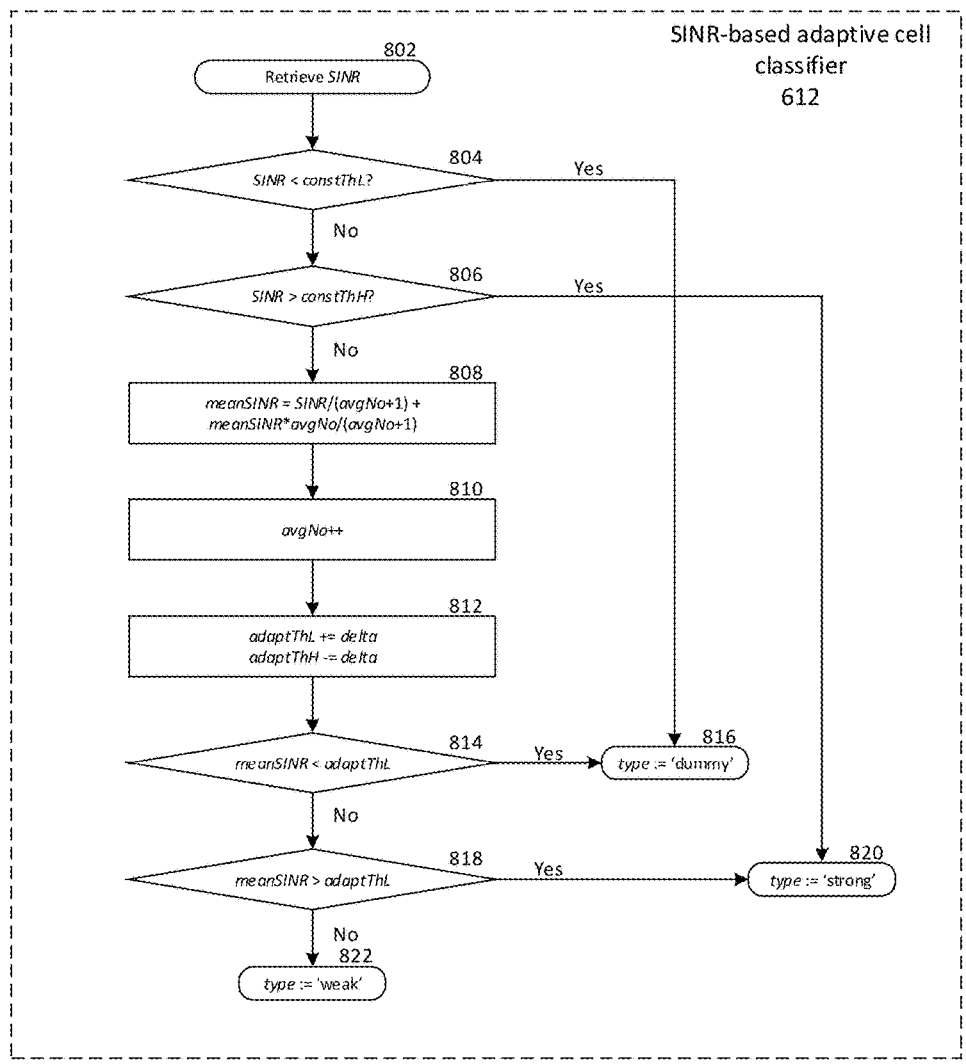
FIG. 8 shows a flow chart illustrating an adaptive cell classification procedure.

As detailed above, the ranking of OTDOA neighbor cells may be based on an SINR-based adaptive cell classifier for classifying each OTDOA neighbor cell as weak, dummy, or strong based on an SINR measurement obtained for each OTDOA neighbor cell in 610. FIG. 8 shows a flow chart illustrating the SINR-based adaptive cell classifier of 612 as performed by baseband modem 406. As will be detailed, baseband modem 406 may use constant and adaptive SINR thresholds in order to classify OTDOA neighbor cells as weak, dummy, or strong, which baseband modem 406 may subsequently apply in 618 in order to sort ranked index vector idx.

As previously indicated, OTDOA neighbor cells having strong wireless channels (indicated by high SINR measurements) may be classified as strong cells, while OTDOA neighbor cells having very weak wireless channels (indicated by low SINR measurements) may be classified as dummy or undetectable cells. The remaining OTDOA neighbor cells that remain detectable but have nevertheless weak wireless channels may then be classified as weak cells.

In a straightforward approach, baseband modem 406 may apply the SINR-based adaptive cell classier by simply selecting two constant thresholds, e.g. constThWeak and constThStrong, where constThStrong>constThWeak. Baseband modem 406 may then apply the SINR-based adaptive cell classifier by classifying OTDOA neighbor cells with SINR measurements SINR>constThStrong as strong cells, OTDOA neighbor cells with constThWeak<SINR<constThStrong as weak cells, and OTDOA neighbor cells with SINR<constThWeak as dummy cells. Baseband modem 406 may then sort ranked index vector idx based on the resulting classifications as detailed regarding FIG. 7.

While such a classifier using one or more constant-thresholds may be feasible, the effect of actual SINR on the accuracy of measured SINR may result in false classifications. For example, an SINR measurement that produces a very low SINR measurement may be much less accurate than an SINR measurement that produces a high SINR measurement, as SINR measurement accuracy may be directly proportional to the actual SINR (i.e. due to the effects of wireless channel quality on measurements).

Accordingly, there may exist a high variance for poor SINR measurements that may result in weak cells being classified as dummy cells and dummy cells being classified as weak cells. When applied to the sorting of idx, such may result in excessive measurements for misclassified "weak" cells (i.e. that are actually dummy cells) and too few measurements for misclassified "dummy" cells (i.e. that are actually weak cells). Accordingly, baseband modem 406 may instead utilize adaptive thresholds in order to compensate for the effects of channel quality-induced variance in SINR measurements.

Specifically, baseband modem 406 may utilize two constant thresholds, constThH and constThL, in addition to two adaptive thresholds, adaptThH and adaptThL, in order to classify each OTDOA neighbor cell based on SINR.

Figure 9:
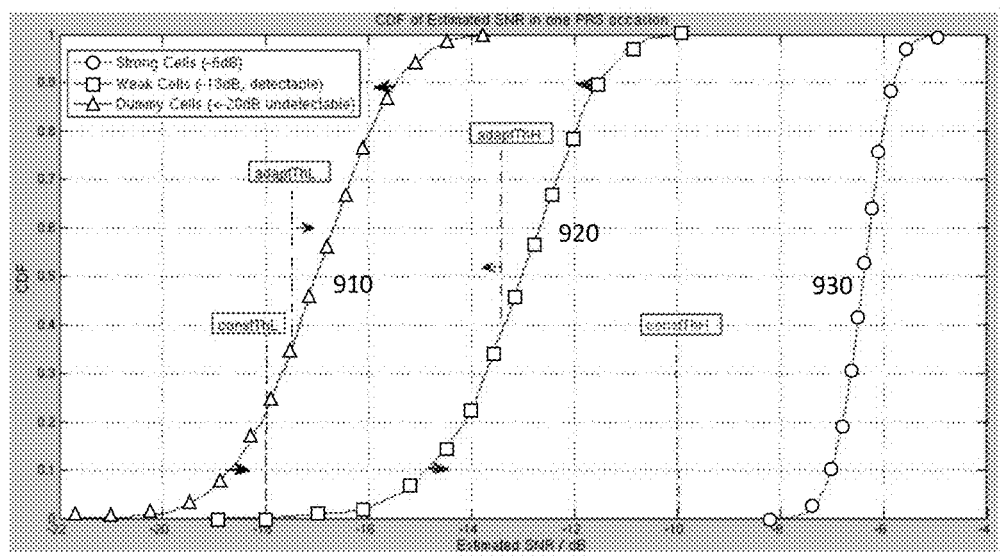
FIG. 9 shows a probabilistic chart illustrating the use of constant and adaptive thresholds in an adaptive cell classification procedure.

FIG. 9 shows Cumulative Distribution Function (CDF) plot 900 depicting the respective CDFs of the actual SINR of a strong cell, a weak cell, and a dummy cell. Specifically, dummy cell CDF curve 910 depicts the CDF of the measured SINR for a dummy cell with actual SINR of −17 dB (with expected value E of −17 dB), weak cell curve 920 depicts the CDF of the measured SINR for a weak cell with actual SINR of −13 dB (with expected value E of −13 dB), and strong cell curve 930 depicts the CDF of the measured SINR for a strong cell with actual SINR of −6.5 dB (with expected value E of −6.5 dB).

As depicted by strong cell CDF curve 930, there exists a low variance in measured SINR strong cells, with a high probability of a given SINR measurement falling between −8 dB and −5 dB. In contrast, there exists a much higher variance in measured SINR for both weak and dummy cells, with measured SINR values probabilistically falling between −20.5 and −14 dB for dummy cells and −18 and −10.5 dB for weak cells. Accordingly, the appreciably higher variances in SINR measurements for weak and dummy cells results in a lower assumed accuracy for any given SINR measurement. Such may directly result from the inherent characteristic of SINR measurements of greater accuracy in low noise channels and low accuracy in high noise channels.

Due to the relatively low variance of SINR measurements strong cells, there exists a clear distinction between SINR measurements of strong cells and weak cells. Accordingly, baseband modem 406 may utilize a constant threshold constThH in order to classify strong cells, i.e. by classifying any OTDOA neighbor cell producing SINR>constThH (e.g. 10 dB in FIG. 9, although other values may be similarly selected) as a strong cell.

However, due to the large variances exhibited by weak cell curve 920 and dummy cell 910, baseband modem 406 may not be able to utilize a constant threshold to strictly differentiate between dummy and weak cells without accepting a high probability of misclassification. Accordingly, baseband modem 406 may define a conservative constant threshold constThL as shown in FIG. 9 (e.g. −18 dB) in order to partially classify dummy cells while minimizing the probability that a weak cell will be misclassified as a dummy cell.

Baseband modem 406 may then apply adaptive thresholds adaptThH (where adaptThH<constThH) and adaptThL (where adaptThL>constThL) in order to differentiate between dummy and weak cells. In order to do so, baseband modem 406 may apply the assumption that the average of multiple SINR measurements will converge toward the expected value of the SINR measurement, e.g. towards −13 dB for weak cell CDF curve 920 and −17 dB for dummy cell CDF curve 930. Accordingly, baseband modem 406 may average the most recent SINR measurement with the average SINR measurement obtained from any previous PRS occasions, thus increasing the SINR measurement accuracy and causing the mean SINR to converge toward the expected value. Baseband modem 406 may then compare the updated mean SINR value to adaptThL and adaptThH to determine whether meanSINR>adaptThH (classified as a weak cell) or whether meanSINR<adaptThL (classified as a dummy cell). In order to reflect the convergence rate of the mean SINR measurements, baseband modem 406 may additionally increment/decrement both adaptThL and adaptThH using step incerement delta, where adaptThL is incremented by delta and adaptThH is decremented by delta for each mean SINR update. As delta depends on the particular SINR measurement convergence rate, delta may be preconfigured based on the SINR averaging gain observed in simulations of the particular SINR estimation algorithm implemented by baseband modem 406 (any established SINR algorithm as previously indicated). Baseband modem 406 may use a uniform value for delta, i.e. the same delta value for both adaptThH and adaptThL, as the convergence speed of SINR estimation to the mean may be the same from both the upper and lower side of the mean. Alternatively, baseband modem 406 may utilize separate values deltaH and deltaL, where baseband modem 406 may utilize deltaH to decrement adaptThH and deltaL to increment adaptThL.

Accordingly, upon retrieving the SINR measurement SINR for the current ncell(idx[k]) in 802, baseband modem 406 may first compare SINR to constThL in 804 to determine if SINR<constThL. If SINR<constThL, baseband modem 406 may classify ncell(idx[k]) as a dummy cell, and accordingly set ncell(idx[k]).type to 'dummy' at 816.

Baseband modem 406 may then compare SINR to constThH in 806 to determine if SINR>constThH, and may classify ncell(idx[k]) as a strong cell by setting ncell(idx[k]).type to 'strong' at 820.

If baseband modem 406 can not classify ncell(idx[k]) based on constThL and constThH, baseband modem 406 may determine if ncell(idx[k]) can be classified based on adaptive thresholds adaptThH and adaptThL. As the adaptive thresholds adaptThL and adaptThH are cell specific, i.e. due to the dependency on the number of SINR measurements contributed to ncell(idx[k]).meanSINR, baseband modem 406 may additionally include the cell-specific fields ncell(idx[k]).adaptThL and ncell(idx[k]).adaptThH in each element of ncell.

Baseband modem 406 may update ncell(idx [k]).meanSINR based on SINR (the most recent SINR measurement for ncell(idx[k]) from 610) and ncell(idx[k]).avgNo, which is the total number of SINR measurements used to obtain ncell(idx[k]).meanSINR in 808 (alternatively baseband modem 406 may additionally include an array SINR [ ] for each element of ncell that contains each SINR measurement, although such may have increased memory requirements). Baseband modem 406 may then increment ncell(idx[k]).avgNo in 810 to reflect the most recent SINR measurement contribution to ncell(idx[k]).meanSINR.

Baseband modem 406 may then update ncell(idx[k]).adaptThL and ncell(idx[k]).adaptThH by delta to reflect the convergence of ncell (idx[k]).meanSINR towards the expected value of SINR in accordance with the number of SINR measurements ncell(idx[k]).avgNo.

After updating ncell(idx[k]).adaptThL and ncell(idx[k]).adaptThH, baseband modem 406 may compare SINR to ncell(idx[k]).adaptThL and ncell(idx[k]).adaptThH to determine whether ncell(idx[k]) can be classified as a dummy cell or weak cell. Specifically, baseband modem 406 may determine if ncell(idx[k]).meanSINR<ncell(idx[k]).adaptThL in 814, and, if yes, may classify ncell(idx[k]) as a dummy cell in 816 by setting ncell(idx[k]).type to 'dummy'. Similarly, baseband modem 406 may determine if ncell(idx[k]).meanSINR>ncell(idx[k]).adaptThH in 818, and, if yes, may classify ncell(idx[k]) as a strong cell in 820 by setting ncell(idx[k]).type to 'strong'.

If ncell(idx[k]) does not satisfy any of the constant or cell-specific adaptive thresholds in any of 804, 806, 814, or 814, baseband modem 406 may classify ncell(idx[k]) as a weak cell in 822 by setting ncell(idx[k]).type to 'weak'.

Accordingly, baseband modem 406 may apply the SINR-based adaptive classifier detailed above in 612 in order to classify each ncell(idx[k]) as a strong cell, weak cell, or dummy cell based on SINR measurements. Baseband modem 406 may then sort ranked index vector idx based on the type field for each ncell, such as by ranking unmeasured cells (which have not been classified as any of strong/weak/dummy as baseband modem 406 has not executed any of 608-614 for such cells) highest, weak cells second-highest, and dummy and strong cells lowest as detailed regarding FIG. 6. Consequently, baseband modem 406 may obtain RSTD measurements for unmeasured cells as soon as possible (as all measured cells will be classified as strong/weak/dummy and accordingly ranked lower according to idx than any unmeasured cells) and obtaining as many RSTD measurements as possible for weak cells.

Baseband modem 406 may apply numerous alternative ranking schemes in 618 in order to sort ranked index vector idx. For example, baseband modem 406 may rank each weak cell (Priority 2 group) based on meanSINR, such that each weak cell ncell(idx[k]) satisfies ncell(idx[k]).meanSINR≤ncell(idx[k+1]).meanSINR. Accordingly, weak cells with lower meanSINR values may be ranked higher than weak cells with higher meanSINR values, thus favoring more RSTD measurements for weak cells with low meanSINR values in order to increase the RSTD measurement accuracy for such low meanSINR weak cells.

Additionally or alternatively, baseband modem 406 may sort ranked index vector idx based on avgNo, i.e. the total number of RSTD measurements (equivalent to the total number of SINR measurements). For example, baseband modem 406 may be configured to rank strong cells equally to weak cells, i.e. in Priority 2 group for idx, until a given strong cell is measured e.g. two (or more) times. Accordingly, as opposed to ranking strong cells in Priority 3 group with weak cells baseband modem 406 may instead attempt to measure each strong cell two times, thus improving RSTD measurement accuracy, by including strong cells that have been measured less than two times in Priority 2 group with weak cells. Upon measuring a strong cell a second time (i.e. avgNo=2), baseband modem 406 may rank strong cells in Priority 3 group. In addition to obtaining a second RSTD measurement for each strong cell, baseband modem 406 may additionally have the possibility to re-classify a strong cell as a weak or dummy cell (which may be unlikely) in the event of an inexplicably inaccurate initial SINR measurement. Baseband modem 406 may similarly be configured to attempt to measure weak cells e.g. two (or more) times in order to potentially re-classify weak cells as dummy or strong cells (which may be unlikely) in the event that the initial SINR measurement was inaccurate.

Similarly, baseband modem 406 may be configured to perform up to a certain number of RSTD measurements for weak cells before ranking a given weak cell in Priority 3 group, such as by performing up to e.g. 4 RSTD measurements for each weak cell before ranking a given weak cell in Priority 3 group. Such may prevent certain weak cells from being measured an unnecessary amount of times compared to other weak cells. Alternatively, may be configured to increase power savings by measuring each weak cell e.g. two times (in addition to measuring each strong and dummy cell one time before classification), and skipping any further RSTD measurements after each weak cell has been measured twice (if possible given M, $N_{ncell}$, and $N_{parallel}$). Such may result in improved power usage at the expense of a slight performance drop (due to reduced RSTD measurement accuracy).

Similarly, baseband modem 406 may have a further parameter $N_{meas}$, which is the total number of RSTD measurements to perform, where $N_{meas} \leq M \cdot N_{parallel}$ (i.e. the maximum number of RSTD measurements for M PRS occasions). Baseband modem 406 may reduce power requirements by performing only performing $N_{meas}$ total RSTD measurements during the OTDOA procedure, such as by iterating an RSTD measurement count variable n for each RSTD measurement and checking in 616 if n==$N_{meas}$, and, if yes, proceeding to 622 to conclude the RSTD session. Baseband modem 406 may similarly employ $N_{meas}$ as an RSTD count threshold per PRS occasion by determining if k==$N_{meas}$ at 616 and, if yes, proceeding to 622 to conclude the RSTD session. Both such cases may conserve power at the expense of RSTD measurement accuracy.

Furthermore, baseband modem 406 may ensure that no strong or dummy cells are measured more than once. For example, depending on $N_{parallel}$ relative to $N_{ncell}$ and the relative numbers of strong cells ($N_{ncell\_s}$), weak cells ($N_{ncell\_w}$), and dummy cells ($N_{ncell\_d}$), strong and/or weak cells may be ranked within the top $N_{parallel}$ entries of ncell according to idx during one or more PRS occasions. In such a scenario, baseband modem 406 may wish to skip RSTD measurements of such strong and (in particular) dummy cells in order to conserve power by avoiding unnecessary RSTD measurements. Accordingly, baseband modem 406 may initialize a second loop variable n to zero at 606 and, if ncell(idx[k]).type='strong' or 'dummy' after immediately prior to 608, may skip 608-614 for ncell(idx[k]) and instead increment n++ and check if n=$N_{ncell}$. As k is not incremented (as baseband modem 406 skips 614) if ncell(idx[k]) .type='strong' or 'dummy', n may reach $N_{ncell}$ prior to k reaching $N_{parallel}$, and accordingly if n reaches $N_{cell}$ baseband modem 406 may proceed to 616 and 618 to sort idx and process any remaining PRS occasions. Baseband modem 406 may thus ensure that only weak or unmeasured cells are measured during each PRS occasion, and accordingly may save power by skipping additional measurements for strong and dummy cells.

Alternative to the SINR-based adaptive threshold classification, baseband modem 406 may instead analyze the variance between multiple RSTD measurements for a given OTDOA neighbor cell. As previously detailed, baseband modem 406 may obtain highly inaccurate, and thus volatile, RSTD measurements for OTDOA neighbor cells having poor wireless channel quality. Accordingly, baseband modem 406 may compare two or more RSTD measurements for a given OTDOA neighbor cell to determine the difference or variance between the RSTD measurements. If the RSTD measurements for a given OTDOA neighbor cell are highly variable, baseband modem 406 may classify the OTDOA neighbor cell as a dummy cell, while baseband modem 406 may classify OTDOA neighbor cells that produce RSTD measurement with lower variance as strong or weak cells, e.g. depending on the determined variance. Baseband modem 406 may similarly apply predetermined variance/difference thresholds in order to classify each OTDOA neighbor cell based on RSTD measurement variance/difference, which may be constant and/or adaptive thresholds.

Accordingly, many such variations based on SINR, meanSINR, avgNo, and other criteria may be available to baseband modem 406 for ranking OTDOA neighbor cells and selecting which OTDOA neighbor cells to measure during each PRS occasion.

Depending on the configuration of baseband modem 406, baseband modem 406 may be configured to implement part of method 600 in parallel, such as by performing separate threads for all or some of 608-612, e.g. a separate thread for each of ncell(idx[k])–ncell(idx[k+$N_{parallel}$–1]). While such may require a more complex configuration of baseband modem 406 (such as in PHY layer measurement circuitry for 608 and 610 and/or processing circuitry for 612), parallel computation may increase the efficiency of the optimized OTDOA procedure.

Additionally, method 600 has been detailed above as performing SINR measurements during the same PRS occasion loop as performing RSTD measurements, which may be particularly applicable for evaluating the accuracy of each RSTD measurement based on the obtained SINR measurement. Baseband modem 406 may additionally perform SINR measurements prior to 604 or 606, such as to obtain an initial SINR measurement for each OTDOA neighbor cell and to obtain an initial ranking for ranked index vector idx. Baseband modem 406 may thus initialize idx in 604 based on the initial SINR measurements, which may involve classifying each OTDOA neighbor cell using the SINR-based adaptive cell classifier or ranking the OTDOA neighbor cells based on SINR. Alternatively, baseband modem 406 may only perform such an initial round of SINR measurements prior to 604 or 606, and may not perform any further SINR measurements. In such a scenario, baseband modem 406 may rely only on the initial SINR measurements for OTDOA neighbor cell ranking and/or classification. While such may simplify computation and reduce power consumption, the resulting performance drop may be substantial in addition to precluding the ability of baseband modem 406 to evaluate RSTD measurements based on SINR.

Furthermore, baseband modem 406 may employ alternative wireless channel metrics to SINR to rank and/or classify OTDOA neighbor cells, such as a signal power measurement (e.g. Reference Signal Received Power (RSRP) or Received Signal Strength Indicator (RSSI)) or a signal quality measurement (e.g. Reference Signal Received Quality (RSRQ)). However, due to the dependence of RSRP and RSRQ on proximity to the measured cell and the presence of payload within the received signal, an SINR-based approach may remain preferable.

Figure 10:
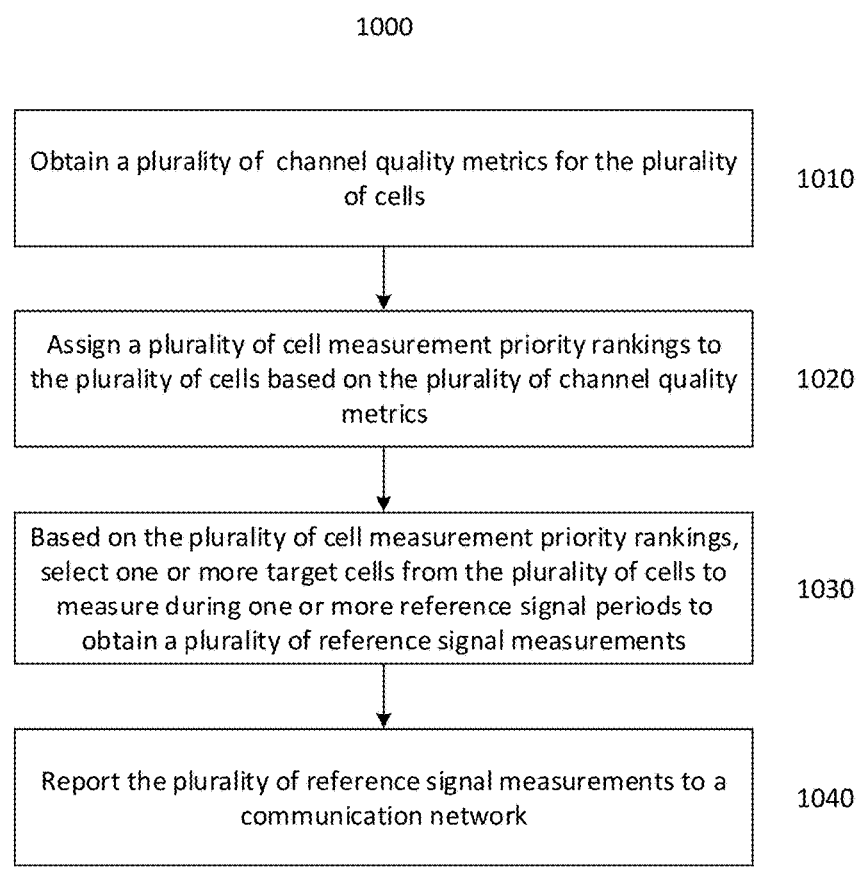
FIG. 10 shows a first method of performing reference signal measurements on a plurality of cells.

FIG. 10 shows a flow chart illustrating method 1000 for performing reference signal measurements on a plurality of cells. As shown in FIG. 10, method 1000 may include obtaining a plurality of channel quality metrics for the plurality of cells (1010), assigning a plurality of cell measurement priority rankings to the plurality of cells based on the plurality of channel quality metrics of the plurality of target cells (1020), based on the cell measurement priority rankings, selecting one or more target cells from the plurality of cells to measure during one or more reference signal periods to obtain a plurality of reference signal measurements (1030), and reporting the plurality of reference signal measurements to a communication network (1040).

In one or more further exemplary aspects of the disclosure, one or more of the features described above in reference to FIGS. 1-9 may be further into method 1000. In particular, method 1000 may be configured to perform further and/or alternate processes as detailed regarding mobile terminal 102 and/or baseband modem 406.

Figure 11:
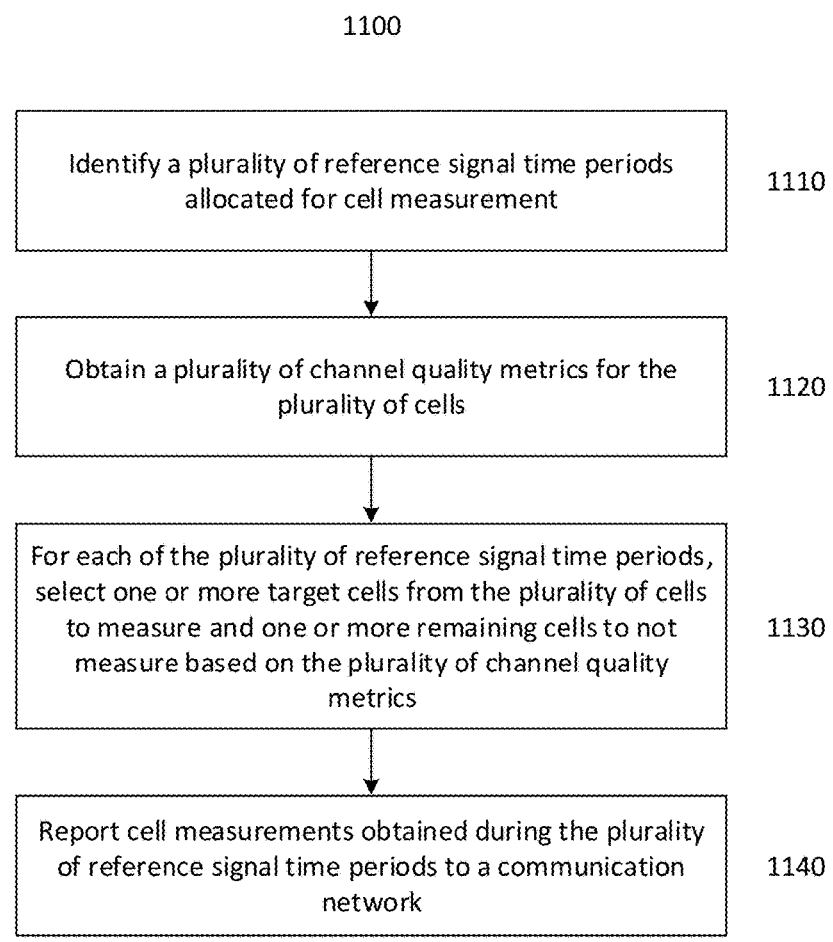
FIG. 11 shows a second method of performing reference signal measurements on a plurality of cells

FIG. 11 shows a flow chart illustrating method 1100 for performing reference signal measurements on a plurality of cells. As shown in FIG. 11, method 1100 may include identifying a plurality of reference signal time periods allocated for cell measurement (1110), obtaining a plurality of channel quality metrics for the plurality of cells, for each of the plurality of reference signal time periods (1120), selecting one or more target cells from the plurality of cells to measure and one or more remaining cells to not measure based on the plurality of channel quality metrics (1130), and reporting cell measurements obtained during the plurality of reference signal time periods to a communication network (1140).

In one or more further exemplary aspects of the disclosure, one or more of the features described above in reference to FIGS. 1-9 may be further into method 1100. In particular, method 1100 may be configured to perform further and/or alternate processes as detailed regarding mobile terminal 102 and/or baseband modem 406.

It is appreciated that the terms "user equipment", "UE", "mobile terminal", etc., may apply to any wireless communication device, including cellular phones, tablets, laptops, personal computers, and any number of additional electronic devices capable of wireless communications.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include a one or more components configured to perform each aspect of the related method.

All acronyms defined in the above description additionally hold in all claims included herein.

The following examples pertain to further aspects of the disclosure:

Example 1 is a method for performing reference signal measurements on a plurality of cells, the method including obtaining a plurality of channel quality metrics for the plurality of cells, assigning a plurality of cell measurement priority rankings to the plurality of cells based on the plurality of channel quality metrics, based on the plurality of cell measurement priority rankings, selecting one or more target cells from the plurality of cells to measure during one or more reference signal periods to obtain a plurality of reference signal measurements, and reporting the plurality of reference signal measurements to a communication network.

In Example 2, the subject matter of Example 1 can optionally include wherein selecting one or more target cells from the plurality of cells to measure during one or more reference signal periods to obtain a plurality of reference signal measurements includes performing a plurality of second channel quality measurements on the plurality of cells to obtain an updated plurality of channel quality metrics of the plurality of cells, selecting one or more first target cells from the plurality of cells to measure during a first reference signal period of the one or more reference signal periods, updating the plurality of cell measurement priority rankings for the plurality of cells based on the updated plurality of channel quality metrics, and selecting one or more second target cells to measure during a second reference signal period of the one or more reference signal periods based on the updated plurality of channel quality metrics.

In Example 3, the subject matter of Example 2 can optionally include wherein obtaining a plurality of channel quality metrics for the plurality of cells includes performing a plurality of first channel quality measurements on the plurality of cells to obtain the plurality of channel quality metrics of the plurality of cells.

In Example 4, the subject matter of any one of Examples 1 to 3 can optionally include wherein selecting one or more target cells from the plurality of cells to measure during one or more reference signal periods to obtain a plurality of reference signal measurements includes selecting one or more remaining cells of the plurality of cells to exclude from measurement during the one or more reference signal periods based on the plurality of cell measurement priority rankings.

In Example 5, the subject matter of any one of Examples 1 to 3 can optionally include wherein selecting one or more target cells from the plurality of cells to measure during one or more reference signal periods to obtain a plurality of reference signal measurements includes selecting a predefined quantity of cells of the plurality of cells as the one or more target cells based on the plurality of cell measurement priority rankings.

In Example 6, the subject matter of Example 5 can optionally include wherein selecting a predefined quantity of cells of the plurality of cells as the one or more target cells based on the plurality of cell measurement priority rankings includes selecting a predefined quantity of cells of the plurality of cells having highest cell measurement priority rankings as the one or more target cells.

In Example 7, the subject matter of any one of Examples 1 to 3 can optionally include wherein selecting one or more target cells from the plurality of cells to measure during one or more reference signal periods to obtain a plurality of reference signal measurements includes selecting a predefined quantity of cells of the plurality of cells that have the highest cell measurement priority rankings as the one or more target cells.

In Example 8, the subject matter of any one of Examples 1 to 7 can optionally include wherein reporting the plurality of reference signal measurements to a communication network includes combining a plurality of first reference signal measurements of the plurality of reference signal measurements that correspond to a first cell of the plurality of cells to obtain a refined reference signal measurement, and reporting the refined reference signal measurement to the communication network In Example 9, the subject matter of Example 8 can optionally include wherein combining a first plurality of reference signal measurements of the plurality of reference signal measurements that correspond to a first cell of the plurality of cells to obtain a refined reference signal measurement includes calculating a mean value of the plurality of first reference signal measurements to generate the refined reference signal measurement, or selecting a specific reference signal measurement from the plurality of first reference signal measurement based on predefined criteria as the refined reference signal measurement.

In Example 10, the subject matter of any one of Examples 1 to 9 can optionally include wherein selecting one or more target cells from the plurality of cells to measure during one or more reference signal periods to obtain a plurality of reference signal measurements includes performing a first time-of-arrival measurement on a first reference signal received from a first target cell of the one or more target cells during a first reference signal period of the one or more reference signal periods, performing a second time-of-arrival measurement on a second reference signal received from a reference cell during the first reference signal period, and comparing the first time-of-arrival measurement with the second time-of-arrival measurement to obtain a first reference signal measurement of the plurality of reference signal measurements.

In Example 11, the subject matter of Example 10 can optionally include wherein the first reference signal and the second reference signal are Positioning Reference Signals (PRSs) and the first reference signal measurement is a Reference Signal Time Difference (RSTD) measurement.

In Example 12, the subject matter of any one of Examples 1 to 11 can optionally include wherein assigning a plurality of cell measurement priority rankings to the plurality of cells based on the plurality of channel quality metrics includes identifying one or more undetectable cells of the plurality of cells as undetectable based on the plurality of channel quality metrics, and identifying one or more detectable cells of the plurality of cells as detectable based on the plurality of channel quality metrics.

In Example 13, the subject matter of Example 12 can optionally include wherein assigning a plurality of cell measurement priority rankings to the plurality of cells based on the plurality of channel quality metrics further includes assigning one or more of the detectable cells having higher respective channel quality metrics a lower cell measurement priority ranking than one or more of the detectable cells having lower respective channel quality metrics.

In Example 14, the subject matter of Example 12 or 13 can optionally include wherein assigning a plurality of cell measurement priority rankings to the plurality of cells based on the plurality of channel quality metrics further includes assigning the one or more undetectable cells a lower cell measurement priority ranking than the one or more detectable cells.

In Example 15, the subject matter of any one of Examples 12 to 14 can optionally include wherein selecting one or more target cells from the plurality of cells to measure during one or more reference signal periods to obtain a plurality of reference signal measurements based on the plurality of cell measurement priority rankings includes selecting a predefined quantity of the plurality of cells having highest respective cell measurement priority rankings as the one or target more cells during a first reference signal period of the one or more reference signal periods.

In Example 16, the subject matter of any one of Examples 1 to 11 can optionally include wherein assigning a plurality of cell measurement priority rankings to the plurality of cells based on the plurality of channel quality metrics includes assigning a cell measurement priority ranking to each of the plurality of cells based on whether each of the plurality of cells is detectable or undetectable according to a respective channel quality metric of the plurality of channel quality metrics of each of the plurality of cells.

In Example 17, the subject matter of any one of Examples 1 to 11 can optionally include wherein assigning a plurality of cell measurement priority rankings to the plurality of cells based on the plurality of channel quality metrics includes assigning a cell measurement priority ranking to each of the plurality of cells based on whether each of the plurality of cells have a strong channel quality or a weak channel quality according to a respective channel quality metric of the plurality of channel quality metrics of each of the plurality of cells.

In Example 18, the subject matter of any one of Examples 1 to 17 can optionally include wherein the plurality of reference signal measurements are Reference Signal Time Difference (RSTD) measurements, and wherein the one or more reference signal periods are Positioning Reference Signal (PRS) occasions.

In Example 19, the subject matter of any one of Examples 1 to 18 can optionally further include identifying one or more unmeasured cells that have not been measured during the one or more reference signal periods, and assigning the one or more unmeasured cells a higher cell measurement priority ranking than the plurality of cells.

In Example 20, the subject matter of any one of Examples 1 to 11 can optionally include wherein assigning a plurality of cell measurement priority rankings to the plurality of cells based on the plurality of channel quality metrics includes identifying one or more undetectable cells of the plurality of cells as undetectable based on a respective channel quality metric of the plurality of channel quality metrics for each of the plurality of cells, and assigning the one or more undetectable cells a lower respective cell measurement priority rankings than one or more detectable cells of the plurality of cells.

In Example 21, the subject matter of Example 1 can optionally include wherein the one or more reference signal periods are a plurality of reference signal periods, and wherein selecting one or more target cells from the plurality of cells to measure during one or more reference signal periods to obtain a plurality of reference signal measurements includes selecting one or target more cells of the plurality of cells to measure during each of the plurality of reference signal periods.

In Example 22, the subject matter of Example 1 can optionally include wherein the one or more reference signal periods are a plurality of reference signal periods, and wherein selecting one or more target cells from the plurality of cells to measure during one or more reference signal periods to obtain a plurality of reference signal measurements includes updating the plurality of cell measurement priority rankings for each of the plurality of reference signal periods to obtain an updated plurality of cell measurement priority rankings for the plurality of cells during each of the plurality of reference signal periods, and selecting an updated set of one or more target cells from the plurality of cells to measure during each of the plurality of reference signal periods based on the updated plurality of cell measurement priority rankings.

In Example 23, the subject matter of Example 22 can optionally include wherein updating the plurality of cell measurement priority rankings for each of the plurality of reference signal periods to obtain an updated plurality of cell measurement priority rankings for the plurality of cells during each of the plurality of reference signal periods includes performing a channel quality measurement for each of the plurality of cells to obtain a plurality of updated channel quality metrics for the plurality of cells, and updating the plurality of cell measurement priority rankings based on the plurality of updated channel quality metrics to obtain the updated plurality of cell measurement priority rankings.

In Example 4, the subject matter of any one of Examples 1 to 23 can optionally further include receiving control signaling that identifies the plurality of cells.

In Example 25, the subject matter of any one of Examples 1 to 24 can optionally further include receiving control signaling that identifies time and frequency scheduling of the one or more reference signal periods.

In Example 26, the subject matter of any one of Examples 1 to 25 can optionally include wherein reporting the plurality of reference signal measurements to a communication network includes transmitting a measurement report to a base station of the communication network.

In Example 27, the subject matter of any one of Examples 1 to 26 can optionally include wherein the plurality of reference signal measurements are reference signal time-of-arrival difference measurements.

Example 28 is a mobile baseband modem including digital processing circuitry, the digital processing circuitry configured to perform the method of any one of Examples 1 to 27.

Example 29 is a mobile terminal device including an RF transceiver and a baseband processing circuit adapted to interact with the RF transceiver to transmit and receive radio signals on a communication network, the baseband processing circuit configured to perform the method of any one of Examples 1 to 27.

Example 30 is a mobile communication device including an RF transceiver and a baseband processing circuit adapted to interact with the RF transceiver to transmit and receive radio signals on a communication network, the baseband processing circuit configured to obtain a plurality of channel quality metrics for a plurality of cells, assign a plurality of cell measurement priority rankings to the plurality of cells based on the plurality of channel quality metrics, based on the plurality of cell measurement priority rankings, select one or more target cells of the plurality of cells to measure during one or more reference signal periods to obtain a plurality of reference signal measurements, and report the plurality of reference signal measurements to a communication network.

In Example 31, the subject matter of Example 30 can optionally include wherein the baseband processing circuit includes physical layer processing circuitry configured to measure received radio signals to obtain the plurality of channel quality metrics.

In Example 32, the subject matter of Example 30 or 31 can optionally include wherein selecting one or more target cells from the plurality of cells to measure during one or more reference signal periods to obtain a plurality of reference signal measurements includes performing a plurality of second channel quality measurements on the plurality of cells to obtain an updated plurality of channel quality metrics for the plurality of cells. selecting one or more first target cells from the plurality of cells to measure during a first reference signal period of the one or more reference signal periods, updating the plurality of cell measurement priority rankings for the plurality of cells based on the updated plurality of channel quality metrics, and selecting one or more second target cells of the plurality of cells to measure during a second reference signal period of the one or more reference signal periods based on the updated plurality of channel quality metrics.

In Example 33, the subject matter of Example 32 can optionally include wherein obtaining a channel quality metric for the plurality of cells includes performing a plurality of first channel quality measurements on the plurality of cells to obtain the plurality of channel quality metrics for the plurality of cells.

In Example 34, the subject matter of any one of Examples 30 to 33 can optionally include wherein selecting one or more target cells from the plurality of cells to measure during one or more reference signal periods to obtain a plurality of reference signal measurements includes selecting one or more remaining cells of the plurality of cells to exclude from measurement during the one or more reference signal periods based on the plurality of cell measurement priority rankings.

In Example 35, the subject matter of any one of Examples 30 to 34 can optionally include wherein selecting one or more target cells from the plurality of cells to measure during one or more reference signal periods to obtain a plurality of reference signal measurements includes selecting a predefined quantity of cells of the plurality of cells as the one or more target cells based on the plurality of cell measurement priority rankings.

In Example 36, the subject matter of Example 35 can optionally include wherein selecting a predefined quantity of cells from the plurality of cells as the one or more target cells based on the plurality of cell measurement priority rankings includes selecting a predefined quantity of cells from the plurality of cells having highest cell measurement priority rankings as the one or more target cells.

In Example 37, the subject matter of any one of Examples 30 to 34 can optionally include wherein selecting one or more target cells from the plurality of cells to measure during one or more reference signal periods to obtain a plurality of reference signal measurements includes selecting a predefined quantity of cells from the plurality of cells that have the highest cell measurement priority rankings as the one or more target cells.

In Example 38, the subject matter of any one of Examples 30 to 37 can optionally include wherein reporting the plurality of reference signal measurements to a communication network includes combining a plurality of first reference signal measurements of the plurality of reference signal measurements that correspond to a first cell of the plurality of cells to obtain a refined reference signal measurement, and reporting the refined reference signal measurement to the communication network In Example 39, the subject matter of Example 38 can optionally include wherein combining a first plurality of reference signal measurements of the plurality of reference signal measurements that correspond to a first cell of the plurality of cells to obtain a refined reference signal measurement includes calculating a mean value of the plurality of first reference signal measurements to generate the refined reference signal measurement, or selecting a specific reference signal measurement from the plurality of first reference signal measurement based on predefined criteria as the refined reference signal measurement.

In Example 40, the subject matter of any one of Examples 30 to 39 can optionally include wherein selecting one or more target cells from the plurality of cells to measure during one or more reference signal periods to obtain a plurality of reference signal measurements includes performing a first time-of-arrival measurement on a first reference signal received from a first target cell of the one or more target cells during a first reference signal period of the one or more reference signal periods, performing a second time-of-arrival measurement on a second reference signal received from a reference cell during the first reference signal period, and comparing the first time-of-arrival measurement with the second time-of-arrival measurement to obtain a first reference signal measurement of the plurality of reference signal measurements.

In Example 41, the subject matter of Example 40 can optionally include wherein the first reference signal and the second reference signal are Positioning Reference Signals (PRSs) and the first reference signal measurement is a Reference Signal Time Difference (RSTD) measurement.

In Example 42, the subject matter of any one of Examples 30 to 41 can optionally include wherein assigning a plurality of cell measurement priority rankings to the plurality of cells based on the plurality of channel quality metrics includes identifying one or more undetectable cells of the plurality of cells as undetectable based on the plurality of channel quality metrics, and identifying one or more detectable cells of the plurality of cells as detectable based on the plurality of channel quality metrics.

In Example 43, the subject matter of Example 42 can optionally include wherein assigning a plurality of cell measurement priority rankings to the plurality of cells based on the plurality of channel quality metrics of the plurality of target cells further includes assigning one or more of the detectable cells having higher respective channel quality metrics a lower cell measurement priority ranking than one or more of the detectable cells having lower respective channel quality metrics.

In Example 44, the subject matter of Example 42 or 43 can optionally include wherein assigning a plurality of cell measurement priority rankings to the plurality of cells based on the plurality of channel quality metrics further includes assigning the one or more undetectable cells a lower cell measurement priority ranking than the one or more detectable cells.

In Example 45, the subject matter of any one of Examples 42 to 44 can optionally include wherein selecting one or more target cells from the plurality of cells to measure during one or more reference signal periods to obtain a plurality of reference signal measurements based on the plurality of cell measurement priority rankings includes selecting a predefined quantity of the plurality of cells having highest respective cell measurement priority rankings as the one or target more cells during a first reference signal period of the one or more reference signal periods.

In Example 46, the subject matter of any one of Examples 30 to 41 can optionally include wherein assigning a plurality of cell measurement priority rankings to the plurality of cells based on the plurality of channel quality metrics includes assigning a cell measurement priority ranking to each of the plurality of cells based on whether each of the plurality of cells is detectable or undetectable according to a respective channel quality metric of the plurality of channel quality metrics of each of the plurality of cells.

In Example 47, the subject matter of any one of Examples 30 to 41 can optionally include wherein assigning a plurality of cell measurement priority rankings to the plurality of cells based on the plurality of channel quality metrics includes assigning a cell measurement priority ranking to each of the plurality of cells based on whether each of the plurality of cells have a strong channel quality or a weak channel quality according to a respective channel quality metric of the plurality of channel quality metrics of each of the plurality of cells.

In Example 48, the subject matter of any one of Examples 30 to 47 can optionally include wherein the plurality of reference signal measurements are Reference Signal Time Difference (RSTD) measurements, and wherein the one or more reference signal periods are Positioning Reference Signal (PRS) occasions.

In Example 49, the subject matter of any one of Examples 30 to 48 can optionally include wherein the baseband processing circuit is further configured to identify one or more unmeasured cells that have not been measured during the one or more reference signal periods, and assign the one or more unmeasured cells a higher cell measurement priority ranking than the plurality of cells.

In Example 50, the subject matter of any one of Examples 30 to 41 can optionally include wherein assigning a plurality of cell measurement priority rankings to the plurality of cells based on the plurality of channel quality metrics includes identifying one or more undetectable cells of the plurality of cells as undetectable based on a respective channel quality metric of the plurality of channel quality metrics for each of the plurality of cells, and assigning the one or more undetectable cells a lower respective cell measurement priority rankings than one or more detectable cells of the plurality of cells.

In Example 51, the subject matter of Example 30 can optionally include wherein the one or more reference signal periods are a plurality of reference signal periods, and wherein selecting one or more target cells from the plurality of cells to measure during one or more reference signal periods to obtain a plurality of reference signal measurements includes selecting one or target more cells of the plurality of cells to measure during each of the plurality of reference signal periods.

In Example 52, the subject matter of Example 30 can optionally include wherein the one or more reference signal periods are a plurality of reference signal periods, and wherein selecting one or more target cells from the plurality of cells to measure during one or more reference signal periods to obtain a plurality of reference signal measurements includes updating the plurality of cell measurement priority rankings for each of the plurality of reference signal periods to obtain an updated plurality of cell measurement priority rankings for the plurality of cells, and selecting an updated set of one or more target cells from the plurality of cells to measure during each of the plurality of reference signal periods based on the updated plurality of cell measurement priority rankings.

In Example 53, the subject matter of Example 52 can optionally include wherein updating the plurality of cell measurement priority rankings for each of the plurality of reference signal periods to obtain an updated plurality of cell measurement priority rankings for the plurality of cells includes performing a channel quality measurement for each of the plurality of cells to obtain a plurality of updated channel quality metrics for the plurality of cells, and updating the plurality of cell measurement priority rankings based on the plurality of updated channel quality metrics to obtain the updated plurality of cell measurement priority rankings.

In Example 54, the subject matter of any one of Examples 30 to 53 can optionally include wherein the baseband processing circuit is further configured to receive control signaling that identifies the plurality of cells.

In Example 55, the subject matter of any one of Examples 30 to 54 can optionally include wherein the baseband processing circuit is further configured to receive control signaling that identifies time and frequency scheduling of the one or more reference signal periods.

In Example 56, the subject matter of any one of Examples 30 to 55 can optionally include wherein reporting the plurality of reference signal measurements to a communication network includes transmitting a measurement report to a base station of the communication network.

In Example 57, the subject matter of any one of Examples 30 to 56 can optionally include wherein the plurality of reference signal measurements are reference signal time-of-arrival difference measurements.

In Example 58, the subject matter of any one of Examples 30 to 57 can optionally further include a baseband memory configured to store processor instructions, and wherein the baseband processing circuit is configured to execute the processor instructions to control operation of the baseband processing circuit.

In Example 59, the subject matter of any one of Examples 30 to 57 can optionally further include a baseband memory configured to store information of the plurality of cells.

In Example 60, the subject matter of Example 59 can optionally include wherein the baseband processing circuit is configured to report the plurality of reference signal measurements obtained during the plurality of reference signal time periods to the communication network based on the information stored in the baseband memory.

Example 61 is a method for performing reference signal measurements on a plurality of cells, the method including identifying a plurality of reference signal time periods allocated for cell measurement, obtaining a plurality of channel quality metrics for the plurality of cells, for each of the plurality of reference signal time periods, selecting one or more target cells from the plurality of cells to measure and excluding one or more remaining cells of the plurality of cells from measurement based on the plurality of channel quality metrics, and reporting a plurality of reference signal measurements obtained during the plurality of reference signal time periods to a communication network.

In Example 62, the subject matter of Example 61 can optionally include wherein selecting one or more target cells from the plurality of cells to measure and excluding one or more remaining cells of the plurality of cells from measurement based on the plurality of channel quality metrics includes selecting one or more first cells of the plurality of cells as the one or more target cells to measure during a first reference signal period of the one or more reference signal periods, updating the plurality of channel quality metrics to obtain an updated plurality of channel quality metrics, and selecting one or more second cells of the plurality of cells as the one or more target cells to measure during a second reference signal period of the one or more reference signal periods based on the updated plurality of channel quality metrics.

In Example 63, the subject matter of Example 62 can optionally include wherein obtaining a plurality of channel quality metrics for the plurality of cells includes performing a first channel quality measurement on each of the plurality of cells to obtain the plurality of channel quality metrics.

In Example 64, the subject matter of Example 63 can optionally further include performing a second channel quality measurement on each of the plurality of cells to obtain the updated plurality of channel quality metrics.

In Example 65, the subject matter of Example 61 can optionally include wherein selecting one or more target cells from the plurality of cells to measure and excluding one or more remaining cells of the plurality of cells from measurement based on the plurality of channel quality metrics includes selecting a smaller subset of the plurality of cells as the one or more target cells, wherein the one or more remaining cells are the one or more cells of the plurality of cells that are not in the smaller subset of the plurality of cells.

In Example 66, the subject matter of Example 61 can optionally include wherein selecting one or more target cells from the plurality of cells to measure and excluding one or more remaining cells of the plurality of cells from measurement based on the plurality of channel quality metrics includes selecting a predefined quantity of cells of the plurality of cells as the one or more target cells.

In Example 67, the subject matter of any one of Examples 61 to 66 can optionally further include assigning a plurality of cell measurement priority rankings to the plurality of cells based on the plurality of channel quality metrics, wherein selecting one or more target cells from the plurality of cells to measure and excluding one or more remaining cells of the plurality of cells from measurement based on the plurality of channel quality metrics of each of the plurality of cells includes selecting the one or more target cells from the plurality of cells based on the plurality of cell measurement priority rankings.

In Example 68, the subject matter of Example 67 can optionally include wherein assigning a plurality of cell measurement priority rankings to the plurality of cells based on the plurality of channel quality metrics of the plurality of target cells includes identifying one or more undetectable cells of the plurality of cells as undetectable based on the plurality of channel quality metrics, and identifying one or more detectable cells of the plurality of cells as detectable based on the plurality of channel quality metrics.

In Example 69, the subject matter of Example 68 can optionally include wherein assigning a plurality of cell measurement priority ranking to the plurality of cells based on the plurality of channel quality metrics further includes assigning one or more of the detectable cells having higher respective channel quality metrics a lower cell measurement priority ranking than one or more of the detectable cells having lower respective channel quality metrics.

In Example 70, the subject matter of Example 68 or 69 can optionally include wherein assigning a plurality of cell measurement priority rankings to the plurality of cells based on the plurality of channel quality metrics further includes assigning the one or more undetectable cells a lower cell measurement priority ranking than the one or more detectable cells.

In Example 71, the subject matter of any one of Examples 68 to 70 can optionally include wherein selecting one or more target cells from the plurality of cells to measure and excluding one or more remaining cells of the plurality of cells from measurement based on the plurality of channel quality metrics includes selecting a predefined quantity of the plurality of cells having highest respective cell measurement priority rankings as the one or target more cells to measure during a first reference signal period of the one or more reference signal periods.

In Example 72, the subject matter of Example 67 can optionally include wherein assigning a plurality of cell measurement priority rankings to the plurality of cells based on the plurality of channel quality metrics includes assigning a cell measurement priority ranking to each of the plurality of cells based on whether each of the plurality of cells is detectable or undetectable according to the a respective channel quality metric of the plurality of channel quality metrics of each of the plurality of cells.

In Example 73, the subject matter of Example 67 can optionally include wherein assigning a plurality of cell measurement priority rankings to the plurality of cells based on the plurality of channel quality metrics includes assigning a cell measurement priority ranking to each of the plurality of cells based on whether each of the plurality of cells have a strong channel quality or a weak channel quality according to a respective channel quality metric of the plurality of channel quality metrics of each of the plurality of cells.

In Example 74, the subject matter of Example 67 can optionally include wherein selecting the one or more target cells from the plurality of cells based on the plurality of cell measurement priority rankings includes selecting a predefined quantity of the plurality of cells having highest cell measurement priority rankings as the one or more target cells.

In Example 75, the subject matter of Example 67 can optionally further include identifying one or more unmeasured cells that have not been measured during the one or more reference signal periods, and assigning the one or more unmeasured cells a higher cell measurement priority ranking than the plurality of cells.

In Example 76, the subject matter of Example 67 can optionally include wherein assigning a plurality of cell measurement priority rankings to the plurality of cells based on the plurality of channel quality metrics includes identifying one or more undetectable cells of the plurality of cells as undetectable based on a respective channel quality metric of the plurality of the channel quality metrics for each of the plurality of cells, and assigning the one or more undetectable cells a lower respective cell measurement priority rankings than one or more detectable cells of the plurality of cells.

In Example 77, the subject matter of Example 67 can optionally include wherein selecting one or more target cells from the plurality of cells to measure and excluding one or more remaining cells of the one or more target cells from measurement based on the plurality of channel quality metrics includes updating the plurality of cell measurement priority rankings for each of the plurality of reference signal periods to obtain an updated plurality of cell measurement priority rankings for the plurality of cells during each of the plurality of reference signal periods, and selecting an updated set of one or more target cells of the plurality of cells to measure during each of the plurality of reference signal periods based on the updated plurality of cell measurement priority rankings.

In Example 78, the subject matter of Example 77 can optionally include wherein updating the plurality of cell measurement priority rankings for each of the plurality of reference signal periods to obtain an updated plurality of cell measurement priority rankings for the plurality of cells during each of the plurality of reference signal periods includes performing a channel quality measurement for each of the plurality of cells to obtain a plurality of updated channel quality metrics for the plurality of cells, and updating the plurality of cell measurement priority rankings for the plurality of cells based on the plurality of updated channel quality metrics to obtain the updated plurality of cell measurement priority rankings.

In Example 79, the subject matter of any one of Examples 61 to 78 can optionally include wherein reporting a plurality of reference signal measurements obtained during the plurality of reference signal time periods to a communication network includes combining a plurality of first cell measurements of the plurality of reference signal measurements that correspond to a first cell of the plurality of cells to obtain a refined reference signal measurement, and reporting the refined reference signal measurement to the communication network In Example 80, the subject matter of Example 79 can optionally include wherein combining a plurality of first reference signal measurements of the plurality of reference signal measurements that correspond to a first cell of the plurality of cells to obtain a refined reference signal measurement includes calculating a mean value of the plurality of first reference signal measurements to generate the refined reference signal measurement, or selecting a specific reference signal measurement from the plurality of first reference signal measurement based on predefined criteria as the refined reference signal measurement.

In Example 81, the subject matter of any one of Examples 61 to 80 can optionally include wherein selecting one or more target cells of the plurality of cells to measure and excluding one or more remaining cells of the plurality of cells from measurement based on the plurality of channel quality metrics includes performing a first time-of-arrival measurement on a first reference signal received from a first target cell of the one or more target cells during a first reference signal period of the one or more reference signal periods, performing a second time-of-arrival measurement on a second reference signal received from a reference cell during the first reference signal period, and comparing the first time-of-arrival measurement with the second time-of-arrival measurement to obtain a first reference signal measurement of the plurality of reference signal measurements.

In Example 82, the subject matter of Example 81 can optionally include wherein the first reference signal and the second reference signal are Positioning Reference Signals (PRSs) and the first reference signal measurement is a Reference Signal Time Difference (RSTD) measurement.

In Example 83, the subject matter of Example one can optionally include Examples 61 to 81, wherein the plurality of reference signal measurements are Reference Signal Time Difference (RSTD) measurements, and wherein the one or more reference signal periods are Positioning Reference Signal (PRS) occasions.

In Example 84, the subject matter of Example 61 can optionally include wherein selecting one or more target cells from the plurality of cells to measure and excluding one or more remaining cells of the one or more target cells from measurement based on the plurality of channel quality metrics includes updating the plurality of channel quality metrics to obtain an updated plurality of channel quality metrics during each of the plurality of reference signal periods, and selecting an updated set of one or more target cells of the plurality of cells to measure during each of the plurality of reference signal periods based on the updated plurality of channel quality metrics.

In Example 85, the subject matter of any one of Examples 61 to 84 can optionally further include receiving control signaling that identifies the plurality of cells.

In Example 86, the subject matter of any one of Examples 61 to 85 can optionally further include receiving control signaling that identifies time and frequency scheduling of the one or more reference signal periods.

In Example 87, the subject matter of any one of Examples 61 to 86 can optionally include wherein reporting the plurality of reference signal measurements to a communication network includes transmitting a measurement report to a base station of the communication network.

In Example 88, the subject matter of any one of Examples 61 to 87 can optionally include wherein the plurality of reference signal measurements are reference signal time-of-arrival difference measurements.

Example 89 is a mobile baseband modem including digital processing circuitry, the digital processing circuitry configured to perform the method of any one of Examples 61 to 88.

Example 90 is a mobile terminal device including an RF transceiver and a baseband processing circuit adapted to interact with the RF transceiver to transmit and receive radio signals on a communication network, the baseband processing circuit configured to perform the method of any one of Examples 61 to 88.

Example 91 is a mobile communication device including an RF transceiver and a baseband processing circuit adapted to interact with the RF transceiver to transmit and receive radio signals on a communication network, the baseband processing circuit configured to identify a plurality of reference signal time periods allocated for cell measurement, obtain a plurality of channel quality metrics for a plurality of cells, for each of the plurality of reference signal time periods, select one or more target cells from the plurality of cells to measure and exclude one or more remaining cells of the plurality of cells from measurement based on the plurality of channel quality metrics, and report a plurality of reference signal measurements obtained during the plurality of reference signal time periods to a communication network.

In Example 92, the subject matter of Example 91 can optionally include wherein the baseband processing circuit includes physical layer processing circuitry configured to measure received radio signals to obtain the plurality of channel quality metrics.

In Example 93, the subject matter of Example 91 or 92 can optionally include wherein selecting one or more target cells from the plurality of cells to measure and excluding one or more remaining cells of the plurality of cells from measurement based on the plurality of channel quality metrics includes selecting one or more first cells of the plurality of cells as the one or more target cells to measure during a first reference signal period of the one or more reference signal periods, updating the plurality of channel quality metrics to obtain an updated plurality of channel quality metrics, and selecting one or more second cells of the plurality of cells as the one or more target cells to measure during a second reference signal period of the one or more reference signal periods based on the updated plurality of channel quality metrics.

In Example 94, the subject matter of Example 93 can optionally include wherein obtaining a plurality of channel quality metrics for the plurality of cells includes performing a first channel quality measurement on each of the plurality of cells to obtain the plurality of channel quality metrics.

In Example 95, the subject matter of Example 94 can optionally include wherein the baseband processing circuit is further configured to perform a second channel quality measurement on each of the plurality of cells to obtain the updated plurality of channel quality metrics.

In Example 6, the subject matter of Example 91 can optionally include wherein selecting one or more target cells from the plurality of cells to measure and excluding one or more remaining cells of the plurality of cells from measurement based on the plurality of channel quality metrics includes selecting a smaller subset of the plurality of cells as the one or more target cells, wherein the one or more remaining cells are the one or more cells of the plurality of cells that are not in the smaller subset of the plurality of cells.

In Example 97, the subject matter of Example 91 can optionally include wherein selecting one or more target cells from the plurality of cells to measure and excluding one or more remaining cells of the plurality of cells from measurement based on the plurality of channel quality metrics includes selecting a predefined quantity of cells of the plurality of cells as the one or more target cells.

In Example 98, the subject matter of any one of Examples 91 to 97 can optionally include wherein the baseband processing circuit is further configured to assign a plurality of cell measurement priority rankings to the plurality of cells based on the plurality of channel quality metrics, wherein selecting one or more target cells from the plurality of cells to measure and excluding one or more remaining cells of the plurality of cells from measurement based on the plurality of channel quality metric of each of the plurality of cells includes selecting the one or more target cells from the plurality of cells based on the plurality of cell measurement priority rankings.

In Example 99, the subject matter of Example 98 can optionally include wherein assigning a plurality of cell measurement priority rankings to the plurality of cells based on the plurality of channel quality metrics includes identifying one or more undetectable cells of the plurality of cells as undetectable based on the plurality of channel quality metrics, and identifying one or more detectable cells of the plurality of cells as detectable based on the plurality of channel quality metrics.

In Example 100, the subject matter of Example 99 can optionally include wherein assigning a plurality of cell measurement priority rankings to the plurality of cells based on the plurality of channel quality metrics includes assigning one or more of the detectable cells having higher respective channel quality metrics a lower cell measurement priority ranking than one or more of the detectable cells having lower respective channel quality metrics.

In Example 101, the subject matter of Example 99 or 100 can optionally include wherein assigning a plurality of cell measurement priority rankings to the plurality of cells based on the plurality of channel quality metrics includes assigning the one or more undetectable cells a lower cell measurement priority ranking than the one or more detectable cells.

In Example 102, the subject matter of any one of Examples 99 to 101 can optionally include wherein selecting one or more target cells from the plurality of cells to measure and excluding one or more remaining cells of the plurality of cells from measurement based on the plurality of channel quality metrics includes selecting a predefined quantity of the plurality of cells having highest respective cell measurement priority rankings as the one or target more cells to measure during a first reference signal period of the one or more reference signal periods.

In Example 103, the subject matter of Example 98 can optionally include wherein assigning a plurality of cell measurement priority rankings to the plurality of cells based on the plurality of channel quality metrics includes assigning a cell measurement priority ranking to each of the plurality of cells based on whether each of the plurality of cells is detectable or undetectable according to a respective channel quality metric of the plurality of channel quality metrics of each of the plurality of cells.

In Example 104, the subject matter of Example 98 can optionally include wherein assigning a plurality of cell measurement priority rankings to the plurality of cells based on the plurality of channel quality metrics includes assigning a cell measurement priority ranking to each of the plurality of cells based on whether each of the plurality of cells have a strong channel quality or a weak channel quality according to a respective channel quality metric of the plurality of channel quality metrics of each of the plurality of cells.

In Example 105, the subject matter of Example 98 can optionally include wherein selecting the one or more target cells from the plurality of cells based on the plurality of cell measurement priority rankings includes selecting a predefined quantity of the plurality of cells having highest cell measurement priority rankings as the one or more target cells.

In Example 106, the subject matter of Example 98 can optionally include wherein the baseband processing circuit is further configured to identify one or more unmeasured cells that have not been measured during the one or more reference signal periods, and assign the one or more unmeasured cells a higher cell measurement priority ranking than the plurality of cells.

In Example 107, the subject matter of Example 98 can optionally include wherein assigning a plurality of cell measurement priority rankings to the plurality of cells based on the plurality of channel quality metrics includes identifying one or more undetectable cells of the plurality of cells as undetectable based on a respective channel quality metric of the plurality of channel quality metrics for each of the plurality of cells, and assigning the one or more undetectable cells a lower respective cell measurement priority rankings than one or more detectable cells of the plurality of cells.

In Example 108, the subject matter of Example 98 can optionally include wherein selecting one or more target cells from the plurality of cells to measure and excluding one or more remaining cells of the one or more target cells from measurement based on the plurality of channel quality metrics includes updating the plurality of cell measurement priority rankings for each of the plurality of reference signal periods to obtain an updated plurality of cell measurement priority rankings for the plurality of cells during each of the plurality of reference signal periods, and selecting an updated set of one or more target cells of the plurality of cells to measure during each of the plurality of reference signal periods based on the updated plurality of cell measurement priority rankings.

In Example 109, the subject matter of Example 108 can optionally include wherein updating the plurality of cell measurement priority rankings for each of the plurality of reference signal periods to obtain an updated plurality of cell measurement priority rankings for the plurality of cells during each of the plurality of reference signal periods includes performing a channel quality measurement for each of the plurality of cells to obtain a plurality of updated channel quality metrics for the plurality of cells, and updating the plurality of cell measurement priority rankings for the plurality of cells based on the plurality of updated channel quality metrics to obtain the updated plurality of cell measurement priority rankings.

In Example 110, the subject matter of any one of Examples 91 to 109 can optionally include wherein reporting a plurality of reference signal measurements obtained during the plurality of reference signal time periods to a communication network includes combining a plurality of first cell measurements of the plurality of reference signal measurements that correspond to a first cell of the plurality of cells to obtain a refined reference signal measurement, and reporting the refined reference signal measurement to the communication network.

In Example 11, the subject matter of Example 110 can optionally include wherein combining a plurality of first reference signal measurements of the plurality of reference signal measurements that correspond to a first cell of the plurality of cells to obtain a refined reference signal measurement calculating a mean value of the plurality of first reference signal measurements to generate the refined reference signal measurement, or selecting a specific reference signal measurement from the plurality of first reference signal measurement based on predefined criteria as the refined reference signal measurement.

In Example 112, the subject matter of any one of Examples 91 to 111 can optionally include wherein selecting one or more target cells of the plurality of cells to measure and excluding one or more remaining cells of the plurality of cells from measurement based on the plurality of channel quality metrics includes performing a first time-of-arrival measurement on a first reference signal received from a first target cell of the one or more target cells during a first reference signal period of the one or more reference signal periods, performing a second time-of-arrival measurement on a second reference signal received from a reference cell during the first reference signal period, and comparing the first time-of-arrival measurement with the second time-of-arrival measurement to obtain a first reference signal measurement of the plurality of reference signal measurements.

In Example 113, the subject matter of Example 112 can optionally include wherein the first reference signal and the second reference signal are Positioning Reference Signals (PRSs) and the first reference signal measurement is a Reference Signal Time Difference (RSTD) measurement.

In Example 114, the subject matter of any one of Examples 91 to 112 can optionally include wherein the plurality of reference signal measurements are Reference Signal Time Difference (RSTD) measurements, and wherein the one or more reference signal periods are Positioning Reference Signal (PRS) occasions.

In Example 115, the subject matter of Example 91 can optionally include wherein selecting one or more target cells from the plurality of cells to measure and excluding one or more remaining cells of the one or more target cells from measurement based on the plurality of channel quality metrics includes updating the plurality of channel quality metrics to obtain an updated plurality of channel quality metrics during each of the plurality of reference signal periods, and selecting an updated set of one or more target cells of the plurality of cells to measure during each of the plurality of reference signal periods based on the updated plurality of channel quality metrics.

In Example 116, the subject matter of any one of Examples 91 to 115 can optionally include wherein the baseband processing circuit is further configured to receive control signaling that identifies the plurality of cells.

In Example 117, the subject matter of any one of Examples 91 to 116 can optionally include wherein the baseband processing circuit is further configured to receive control signaling that identifies time and frequency scheduling of the one or more reference signal periods.

In Example 118, the subject matter of any one of Examples 91 to 117 can optionally include wherein reporting the plurality of reference signal measurements to a communication network includes transmitting a measurement report to a base station of the communication network.

In Example 119, the subject matter of any one of Examples 91 to 118 can optionally include wherein the plurality of reference signal measurements are reference signal time-of-arrival difference measurements.

In Example 120, the subject matter of any one of Examples 92 to 119 can optionally further include a baseband memory configured to store processor instructions, and wherein the baseband processing circuit is configured to execute the processor instructions to control operation of the baseband processing circuit.

In Example 121, the subject matter of any one of Examples 92 to 119 can optionally further include a baseband memory configured to store information of the plurality of cells.

In Example 122, the subject matter of Example 121 can optionally include wherein the baseband processing circuit is configured to report the plurality of reference signal measurements obtained during the plurality of reference signal time periods to the communication network based on the information stored in the baseband memory.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A mobile communication device comprising an RF transceiver and a baseband processing circuit adapted to interact with the RF transceiver to transmit and receive radio signals on a communication network, the baseband processing circuit configured to:
  obtain a plurality of channel quality metrics for a plurality of cells;
  identify one or more cells of the plurality of cells as detectable based on the plurality of channel quality metrics;
  identify one or more cells of the plurality of cells as undetectable based on the plurality of channel quality metrics;
  assign a plurality of cell measurement priority rankings to the plurality of cells based on the plurality of channel quality metrics; wherein one or more of the detectable cells having one or more higher respective channel quality metrics is assigned a lower cell measurement priority ranking than a detectable cell having a lower respective channel quality metric;
  based on the plurality of cell measurement priority rankings, select one or more target cells of the plurality of cells to measure during one or more reference signal periods to obtain a plurality of reference signal measurements; and
  report the plurality of reference signal measurements to a communication network.

2. The mobile communication device of claim 1, wherein selecting one or more target cells from the plurality of cells to measure during one or more reference signal periods to obtain a plurality of reference signal measurements comprises:
  performing a plurality of second channel quality measurements on the plurality of cells to obtain an updated plurality of channel quality metrics for the plurality of cells;
  selecting one or more first target cells from the plurality of cells to measure during a first reference signal period of the one or more reference signal periods;
  updating the plurality of cell measurement priority rankings for the plurality of cells based on the updated plurality of channel quality metrics; and
  selecting one or more second target cells of the plurality of cells to measure during a second reference signal period of the one or more reference signal periods based on the updated plurality of channel quality metrics.

3. The mobile communication device of claim 2, wherein obtaining a channel quality metric for the plurality of cells comprises:
  performing a plurality of first channel quality measurements on the plurality of cells to obtain the plurality of channel quality metrics for the plurality of cells.

4. The mobile communication device of claim 1, wherein selecting one or more target cells from the plurality of cells to measure during one or more reference signal periods to obtain a plurality of reference signal measurements comprises:
  selecting a predefined quantity of cells of the plurality of cells as the one or more target cells based on the plurality of cell measurement priority rankings.

5. The mobile communication device of claim 1, wherein selecting one or more target cells from the plurality of cells to measure during one or more reference signal periods to obtain a plurality of reference signal measurements comprises:
  selecting a predefined quantity of cells from the plurality of cells that have the highest cell measurement priority rankings as the one or more target cells.

6. The mobile communication device of claim 1, wherein reporting the plurality of reference signal measurements to a communication network comprises:
  combining a plurality of first reference signal measurements of the plurality of reference signal measurements that correspond to a first cell of the plurality of cells to obtain a refined reference signal measurement; and
  reporting the refined reference signal measurement to the communication network.

7. The mobile communication device of claim 1, wherein assigning a plurality of cell measurement priority rankings to the plurality of cells based on the plurality of channel quality metrics further comprises:
  assigning the one or more undetectable cells a lower cell measurement priority ranking than the one or more detectable cells.

8. The mobile communication device of claim 1, wherein selecting one or more target cells from the plurality of cells to measure during one or more reference signal periods to obtain a plurality of reference signal measurements based on the plurality of cell measurement priority rankings comprises:
  selecting a predefined quantity of the plurality of cells having highest respective cell measurement priority rankings as the one or target more cells during a first reference signal period of the one or more reference signal periods.

9. The mobile communication device of claim 1, wherein assigning a plurality of cell measurement priority rankings to the plurality of cells based on the plurality of channel quality metrics comprises:
  assigning a cell measurement priority ranking to each of the plurality of cells based on whether each of the plurality of cells is detectable or undetectable according to a respective channel quality metric of the plurality of channel quality metrics of each of the plurality of cells.

10. The mobile communication device of claim 1, wherein assigning a plurality of cell measurement priority rankings to the plurality of cells based on the plurality of channel quality metrics comprises:
  assigning a cell measurement priority ranking to each of the plurality of cells based on whether each of the plurality of cells have a strong channel quality or a weak channel quality according to a respective channel quality metric of the plurality of channel quality metrics of each of the plurality of cells.

11. The mobile communication device of claim 1, wherein the plurality of reference signal measurements are Reference Signal Time Difference (RSTD) measurements, and wherein the one or more reference signal periods are Positioning Reference Signal (PRS) occasions.

12. The mobile communication device of claim 1, wherein the one or more reference signal periods are a plurality of reference signal periods,
  and wherein selecting one or more target cells from the plurality of cells to measure during one or more reference signal periods to obtain a plurality of reference signal measurements comprises:
  selecting one or target more cells of the plurality of cells to measure during each of the plurality of reference signal periods.

13. A mobile communication device comprising:
  an RF transceiver and a baseband processing circuit adapted to interact with the RF transceiver to transmit and receive radio signals on a communication network, the baseband processing circuit configured to:
  identify a plurality of reference signal time periods allocated for cell measurement;
  identify one or more cells of the plurality of cells as undetectable based on the plurality of channel quality metrics;
  obtain a plurality of channel quality metrics for a plurality of cells;
  for each of the plurality of reference signal time periods, select one or more target cells from the plurality of cells to measure and exclude one or more remaining cells of the plurality of cells from measurement based on the plurality of channel quality metrics; wherein the one or more remaining cells have the highest respective channel quality metrics but is assigned a lower cell measurement priority ranking than a detectable cell having a lower respective channel quality metric; and
  report a plurality of reference signal measurements obtained during the plurality of reference signal time periods to a communication network.

14. The mobile communication device of claim 13, wherein selecting one or more target cells from the plurality of cells to measure and excluding one or more remaining cells of the plurality of cells from measurement based on the plurality of channel quality metrics comprises:
  selecting a smaller subset of the plurality of cells as the one or more target cells, wherein the one or more remaining cells are the one or more cells of the plurality of cells that are not in the smaller subset of the plurality of cells.

15. The mobile communication device of claim 13, wherein assigning a plurality of cell measurement priority rankings to the plurality of cells based on the plurality of channel quality metrics comprises:
  assigning a cell measurement priority ranking to each of the plurality of cells based on whether each of the plurality of cells is detectable or undetectable according to a respective channel quality metric of the plurality of channel quality metrics of each of the plurality of cells.

16. The mobile communication device of claim 13, wherein assigning a plurality of cell measurement priority rankings to the plurality of cells based on the plurality of channel quality metrics comprises:
  assigning a cell measurement priority ranking to each of the plurality of cells based on whether each of the plurality of cells have a strong channel quality or a weak channel quality according to a respective channel quality metric of the plurality of channel quality metrics of each of the plurality of cells.

17. The mobile communication device of claim 13, wherein the plurality of reference signal measurements are Reference Signal Time Difference (RSTD) measurements, and wherein the one or more reference signal periods are Positioning Reference Signal (PRS) occasions.

18. A method for performing reference signal measurements on a plurality of cells, the method comprising:
  obtaining a plurality of channel quality metrics for the plurality of cells;
  identifying one or more detectable cells of the plurality of cells as detectable based on the plurality of channel quality metrics;
  identify one or more cells of the plurality of cells as undetectable based on the plurality of channel quality metrics;
  assigning a plurality of cell measurement priority rankings to the plurality of detectable cells based on the plurality of channel quality metrics; wherein one or more of the detectable cells having one or more higher respective channel quality metrics is assigned a lower cell measurement priority ranking than a detectable cell having a lower respective channel quality metric;
  based on the plurality of cell measurement priority rankings, selecting one or more target cells from the plurality of cells to measure during one or more reference signal periods to obtain a plurality of reference signal measurements; and
  reporting the plurality of reference signal measurements to a communication network.

19. The method of claim 18, wherein selecting one or more target cells from the plurality of cells to measure during one or more reference signal periods to obtain a plurality of reference signal measurements comprises:
  selecting a predefined quantity of cells of the plurality of cells that have the highest cell measurement priority rankings as the one or more target cells.

20. The method of claim 18, wherein assigning a plurality of cell measurement priority rankings to the plurality of cells based on the plurality of channel quality metrics comprises:
  assigning a cell measurement priority ranking to each of the plurality of cells based on whether each of the plurality of cells is detectable or undetectable according to a respective channel quality metric of the plurality of channel quality metrics of each of the plurality of cells.

21. The method of any one of claim 18, wherein assigning a plurality of cell measurement priority rankings to the plurality of cells based on the plurality of channel quality metrics comprises:
  assigning a cell measurement priority ranking to each of the plurality of cells based on whether each of the plurality of cells have a strong channel quality or a weak channel quality according to a respective channel quality metric of the plurality of channel quality metrics of each of the plurality of cells.

22. The method of claim 18, wherein the plurality of reference signal measurements are Reference Signal Time Difference (RSTD) measurements, and wherein the one or more reference signal periods are Positioning Reference Signal (PRS) occasions.

* * * * *